US008538484B2

(12) United States Patent
Chan et al.

(10) Patent No.: US 8,538,484 B2
(45) Date of Patent: Sep. 17, 2013

(54) PROVIDING A USER WITH FEEDBACK REGARDING POWER CONSUMPTION IN BATTERY-OPERATED ELECTRONIC DEVICES

(75) Inventors: Mike Chan, San Francisco, CA (US); Dianne K. Hackborn, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 460 days.

(21) Appl. No.: 12/829,433

(22) Filed: Jul. 2, 2010

(65) Prior Publication Data

US 2011/0040990 A1  Feb. 17, 2011

Related U.S. Application Data

(63) Continuation-in-part of application No. 12/541,415, filed on Aug. 14, 2009, now Pat. No. 8,280,456.

(51) Int. Cl.
 *H04B 1/38* (2006.01)
 *H04M 1/725* (2006.01)

(52) U.S. Cl.
 CPC ...... *H04M 1/72519* (2013.01); *H04M 1/72522* (2013.01)
 USPC ............................ 455/566; 713/300; 713/340

(58) Field of Classification Search
 USPC ................... 455/566; 703/300, 340
 See application file for complete search history.

(56) References Cited

U.S. PATENT DOCUMENTS

| | | | |
|---|---|---|---|
| 5,560,022 A * | 9/1996 | Dunstan et al. ............... | 713/300 |
| 6,215,275 B1 | 4/2001 | Bean | |
| 6,236,674 B1 | 5/2001 | Morelli et al. | |
| 6,263,200 B1 | 7/2001 | Fujimoto | |
| 7,336,929 B2 | 2/2008 | Yasuda et al. | |
| 7,433,702 B2 | 10/2008 | Lindskog et al. | |
| 7,583,984 B2 | 9/2009 | Sun et al. | |
| 7,680,041 B2 | 3/2010 | Johansen | |
| 2004/0266493 A1 | 12/2004 | Bahl et al. | |
| 2005/0070339 A1 | 3/2005 | Kim | |
| 2005/0085277 A1 | 4/2005 | Chen et al. | |

(Continued)

FOREIGN PATENT DOCUMENTS

| | | |
|---|---|---|
| EP | 1524829 A | 4/2005 |
| EP | 1594232 A | 11/2005 |
| KR | 10-0698162 | 3/2007 |
| KR | 10-2000-0072022 | 10/2007 |

(Continued)

OTHER PUBLICATIONS

International Search Report issued in PCT/US2010/045525 on Feb. 23, 2011 (10 pages).

*Primary Examiner* — William D Cumming
(74) *Attorney, Agent, or Firm* — Fish & Richardson P.C.

(57) ABSTRACT

Methods, systems, and apparatus, including computer programs encoded on a computer storage medium, for providing a user with feedback regarding power consumption in a battery-operated electronic device. In one aspect, a method is performed by one or more data processing apparatus. The method includes receiving, at the data processing apparatus, historical records of power consumption by a collection of battery-operated electronic devices that are operated by different users, aggregating and analyzing, by the data processing apparatus, the historical records to generate representative characterizations of the power consumption on different classes of the battery-operated electronic devices, and outputting, from the data processing apparatus, the representative characterizations of the power consumption by different applications that have executed on the different classes. Each of the battery-operated electronic devices belongs to a class.

20 Claims, 14 Drawing Sheets

(56) References Cited

U.S. PATENT DOCUMENTS

| | | |
|---|---|---|
| 2006/0279256 A1 | 12/2006 | Bletsas |
| 2008/0057894 A1 | 3/2008 | Aleksic et al. |
| 2011/0040990 A1* | 2/2011 | Chan et al. ............ 713/300 |
| 2011/0040996 A1* | 2/2011 | Hackborn et al. ......... 713/340 |
| 2012/0015695 A1* | 1/2012 | Hackborn et al. ......... 455/566 |

FOREIGN PATENT DOCUMENTS

| | | |
|---|---|---|
| KR | 10-2007-0102227 | 10/2007 |
| WO | WO 00/39908 A | 7/2000 |
| WO | WO 2004/105417 | 12/2004 |
| WO | WO 2005/006722 | 1/2005 |
| WO | WO 2005/009062 | 1/2005 |

* cited by examiner

| LONG TERM HISTORY FOR DEVICES OF CLASS N | | | | | | |
|---|---|---|---|---|---|---|
| APP | Dev_1 | Dev_2 | Dev_3 | Dev_... | Dev_N | AVG |
| app_1 | 2 | 1 | 2 | 2 |  | 1.75 |
| app_2 | 4 |  | 5 | 2 | 3 | 3.5 |
| app_3 | 9 | 3 |  |  | 10 | 7.33 |
| app_4 | 5 | 4 |  | 5 |  | 4.67 |
| app_5 | 1 |  |  | 1 |  | 1 |
| app_6 | 11 |  | 3 | 4 | 10 | 7 |
| app_... |  | 2 |  |  | 3 | 2.5 |
| app_N | 7 | 6 |  | 8 | 6 | 6.75 |

1505  1510  1515  1520  1525  1530  1535

PROVIDING A USER WITH FEEDBACK REGARDING POWER CONSUMPTION IN BATTERY-OPERATED ELECTRONIC DEVICES

CROSS-REFERENCE TO RELATED APPLICATIONS

This application is a continuation-in-part of and claims priority to U.S. application Ser. No. 12/541,415, filed on Aug. 14, 2009, the contents of which are incorporated herein by reference.

BACKGROUND

This specification relates to providing a user with feedback regarding power consumption in a battery-operated electronic device.

Modern electronic devices provide a staggering array of functionality to users. Battery-operated portable handheld electronic devices such as telephones, music players, PDA's, and game players can display information on display screens, receive instructions from a user, communicate with other devices using wired and wireless data links, take digital photographs, and process large volumes of digital data at speeds that were unthinkable even a generation ago. Such functionality is implemented using hardware components such as, e.g., display screens, keyboards and keypads, communications interfaces, digital data processors, charge-coupled devices, and other integrated circuits that coordinate the operation of these and other hardware components. These various hardware components consume electrical power and thus help to deplete a battery or batteries in an electronic device.

SUMMARY

This document discusses systems, methods, and techniques by which a battery-operated electronic device, such as a smartphone or a netbook computer, can provide a user with information about which hardware and software components of the device consume, or are likely to consume, the most power on the device. For example, a device may display to the user a list of all power consuming hardware components or software applications that are currently operating on the device, along with an indication of how much power each hardware component or software application is consuming (either at the exact instant in time, or over a defined time period) and/or the efficiency of power consumption by the software application. Such indications may be shown as an absolute value (e.g., in Watts or milli-watts) or as a relative value (e.g., in terms of the total power being consumed by all components or applications on the device, or of all components or applications that the user can currently disable). A graphical representation may also be provided so as to help the user make decisions about which components or applications to disable in order to save power.

For example, bars graphs may be shown for each component or application, where the length of the bar approximates the efficiency of power consumed or efficiency of power consumption by the component, or a pie graph may be shown in a similar manner, where the size of each slice represents the relative efficiency of power consumption by a corresponding component. Displays like those just discussed may be shown in response to an explicit user request (e.g., by the user navigating to a tools menu on a device or selecting a power management icon on a desktop or other area of a display on the device) or in response to other events, such as when the device falls below a certain level of power (e.g., 30%) at which a user can be expected to start shutting down non-essential components. In other instances, the system may automatically shut down components or applications in a stepped manner at multiple different battery levels (based on a plan set for the system when it is shipped or by the user at a later time), or may provide suggestions to a user that the user can accept or reject. Such a system can also provide the user with an estimate of the amount of time remaining on their battery if the component or application is left on or turned off, or an estimate of the amount of time that will be added to the battery life by turning off a component or application.

Accordingly, in a first general aspect, a power-management system for electronic devices is described. The system includes a collection of battery-operated electronic devices each programmed to generate a record of power consumption and a server system. Each battery-operated electronic device includes a battery, a data processing unit programmed to execute a plurality of different applications, and a communication interface for outputting the record of power consumption. The server system includes a communication interface programmed to receive the records of power consumption output from the battery-operated electronic devices and one or more data processing devices programmed to analyze the power consumption recorded in the records to generate a composite value that provides a representative characterization of the power consumption by a first application executed on a proper subset of the battery-operated electronic devices in the collection.

This first aspect and the second and third aspects can include one or more of the following features. The server system further can include a power consumption database storing at least some of the content of the records of power consumption. The system can include an anonymizer programmed to anonymize the records of power consumption so that identities of the battery-operated electronic devices or users associated with the battery-operated electronic devices are not discernable from the content stored in the power consumption database. The server system can be programmed to analyze the power consumption recorded in the records to identify outliers in the power consumption of a first application. The server system can include a database that stores information that identifies characteristics of the battery-operated electronic devices in the collection. The server system can be programmed to identify a correlation between the power consumption outliers and a characteristic of the battery-operated electronic devices. The database can store information that identifies applications installed on the battery-operated electronic devices in the collection. The characteristic of the battery-operated electronic devices can include a second application that is installed on the battery-operated electronic devices in which the power consumption outlier occurred.

Other embodiments of this first aspect include corresponding methods and computer programs encoded on computer storage devices.

In a second general aspect, a method performed by one or more data processing apparatus is described. The method includes receiving, at the data processing apparatus, historical records of power consumption by a collection of battery-operated electronic devices that are operated by different users, aggregating and analyzing, by the data processing apparatus, the historical records to generate representative characterizations of the power consumption on different classes of the battery-operated electronic devices, and outputting, from the data processing apparatus, the representative characterizations of the power consumption by different applications that have executed on the different classes. Each of the battery-operated electronic devices belongs to a class.

This second aspect and the first and third aspects can include one or more of the following features. Outputting the characterizations of the power consumption can include outputting, to a first battery-operated electronic device that belongs to a first class, instructions for displaying a presentation that includes power rating indicia that indicate an efficiency of power consumed by applications on other battery-operated electronic devices belonging to the first class. Analyzing the historical records can include identifying outliers in the power consumption of a first application executing on multiple devices. Analyzing the historical records can also include identifying correlations between the outliers in the power consumption and execution of a second application on the multiple devices. Analyzing the historical records can also include identifying correlations between the outliers in the power consumption and a presence of a hardware component at the multiple devices. Receiving the historical records of power consumption can include receiving records of power consumption that is unattributed to particular applications on the battery-operated electronic devices. The method can also include attributing, by the data processing apparatus, the unattributed power consumption to particular applications that are active on the battery-operated electronic devices. Attributing the unattributed power consumption can include identifying the active applications from a record of applications installed on the battery-operated electronic devices. The representative characterizations can include a characterization of an average power consumption per unit time by a first application that has executed on a first class of battery-operated electronic device, a characterization of an average power consumption per unit time by a second application that has executed on the first class of battery-operated electronic device, a characterization of an average power consumption per unit time by the first application that has executed on a second class of battery-operated electronic device, and a characterization of an average power consumption per unit time by the second application that has executed on the second class of battery-operated electronic device.

Other embodiments of this aspect include corresponding systems, apparatus, and computer programs, programmed to perform the actions of the method, encoded on computer storage devices.

In a third general aspect, a computer storage medium is encoded with a computer program. The program includes instructions that when executed by data processing apparatus cause the data processing apparatus to perform operations. The operations include receiving historical records of power consumption by a collection of battery-operated electronic devices operated by different users, attributing the power consumption to different applications executing on the battery-operated electronic devices, generating a collection of composite values that each characterize representative power consumption by one of the applications executing on the battery-operated electronic devices, and reporting the composite values.

This third aspect and the first and second aspects can include one or more of the following features. The composite values can each characterize representative power consumption per unit time by execution of one of the applications on a different class of battery-operated electronic devices. The historical records can be received during check-ins of individual ones of the battery-operated electronic devices. The historical records can include a discharge rate of a battery of the battery-operated electronic devices. The operations can also include receiving usage information characterizing usage of applications installed on the battery-operated electronic devices. The usage information can characterize duration of periods during which applications are used at the same time on the battery-operated electronic devices.

Other embodiments of this aspect include corresponding systems, apparatus, and methods.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
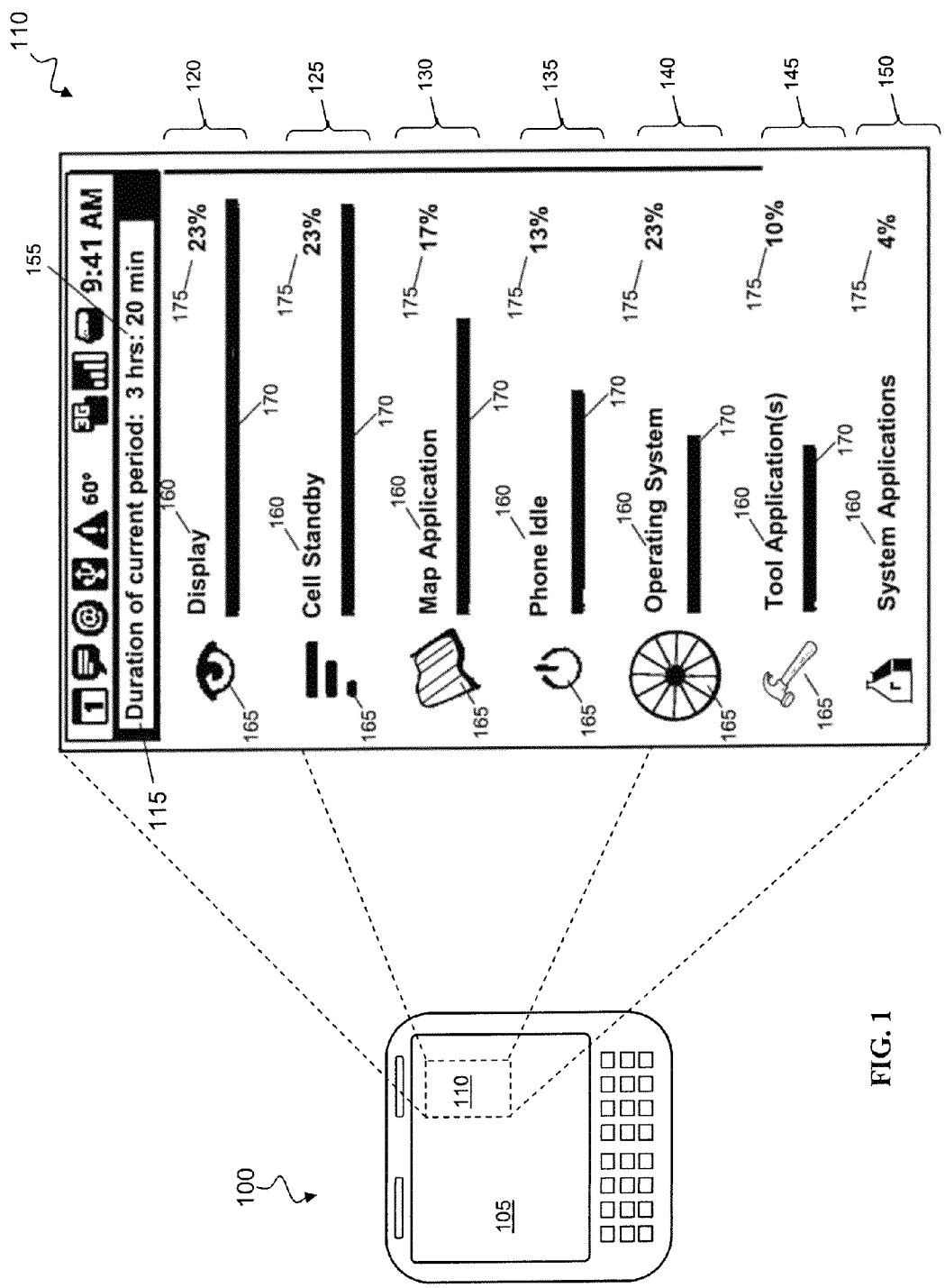
FIG. 1 is a schematic representation of how a user can be provided with feedback regarding power consumption in a battery-operated electronic device.

FIG. 1 is a schematic representation of one way that a user can be provided with feedback regarding power consumption in a battery-operated electronic device 100. In general, device 100 visually shows to a user a plurality of hardware components or software applications operating in device 100, along with a relative amount of power that each of those components or applications is consuming from the device's battery system.

Electronic device 100 can be, e.g., a telephone, music player, a PDA, a game player or other device that includes a display screen 105 that presents graphical images to a user. A portion of display screen 105 includes a power consumption feedback presentation 110. Power consumption feedback presentation 110 presents a user with feedback regarding power consumption by device 100 and can allow a user to understand how the battery power available to electronic device 100 has been or is likely to be spent.

Feedback presentation 110 includes a period identifier 115 and a collection of account entries 120, 125, 130, 135, 140, 145, 150. Period identifier 115 includes text or other information 155 that identifies the period of time for which power consumption feedback is presented in feedback presentation 110. In the illustrated implementation, information 120 identifies that power consumption for a period of a certain duration (i.e., the "current period" of the last three hours and 20 minutes) is provided. In other implementations, power consumption feedback can be provided for periods of time when, e.g., a certain user uses device 100, certain processes are running on device 100, or the like.

Account entries 120, 125, 130, 135, 140, 145, 150 are records that present an accounting of the power consumption of device 100. Different entries 120, 125, 130, 135, 140, 145, 150 can present an accounting of different aspects of the power consumption such as, e.g., the power consumption by one or more hardware components of device 100 or the power consumption by one or more software applications executed on of device 100. For example, in the illustrated implementation, account entry 120 presents an accounting of the power consumption by display screen 105. Account entry 130 presents an accounting of the power consumption by a map application.

In the illustrated implementation, each account entry 120, 125, 130, 135, 140, 145, 150 includes a title 160, a pictorial symbol 165, a visual indicium of power consumption 170, and a textual indicium of power consumption 175. Title 160 is text that identifies the aspect of the power consumption of device 100 for which an accounting is presented in the respective entry. For example, title 160 in entry 140 identifies that entry 140 presents an accounting of power consumption by the operating system of device 100. Title 160 in entry 135 identifies that entry 135 presents an accounting of power consumption by an idle phone of device 100.

Pictorial symbols 165 are pictorial representations of the aspects of the power consumption of device 100 for which accountings are presented in the respective entries. For example, symbol 165 in entry 145 represents that entry 145 presents an accounting of power consumption by tool applications of device 100. Symbol 165 in entry 125 identifies that entry 125 presents an accounting of power consumption by the standby state of a cellular communication system of device 100.

Each visual indicia 170 and textual indicia 175 presents an accounting of the power consumption by the aspects identified by title 160 and represented by symbol 165 in each account entry 120, 125, 130, 135, 140, 145, 150. In the illustrated implementation, textual indicia 175 include text that identifies the percent of the total power consumed by different aspects. Visual indicia 170 are bars of different lengths. The lengths of the bars are normalized to the highest power consumption by any aspect during the period identified by period identifier 115. For example, in the illustrated implementation, visual indicia 170 in entries 120, 125 are the same length and are each represent 23% of the total power consumption during the current period. In contrast, visual indicium 170 in entry 145 represents 10% of the total power consumption during the current period and is $^{10}/_{23}$rds of the length of visual indicia 170 in entries 120, 125. In other implementations, the characteristics of visual indicia 170 can be normalized to, e.g., a total power consumption during the period identified by period identifier 115.

Figure 2:
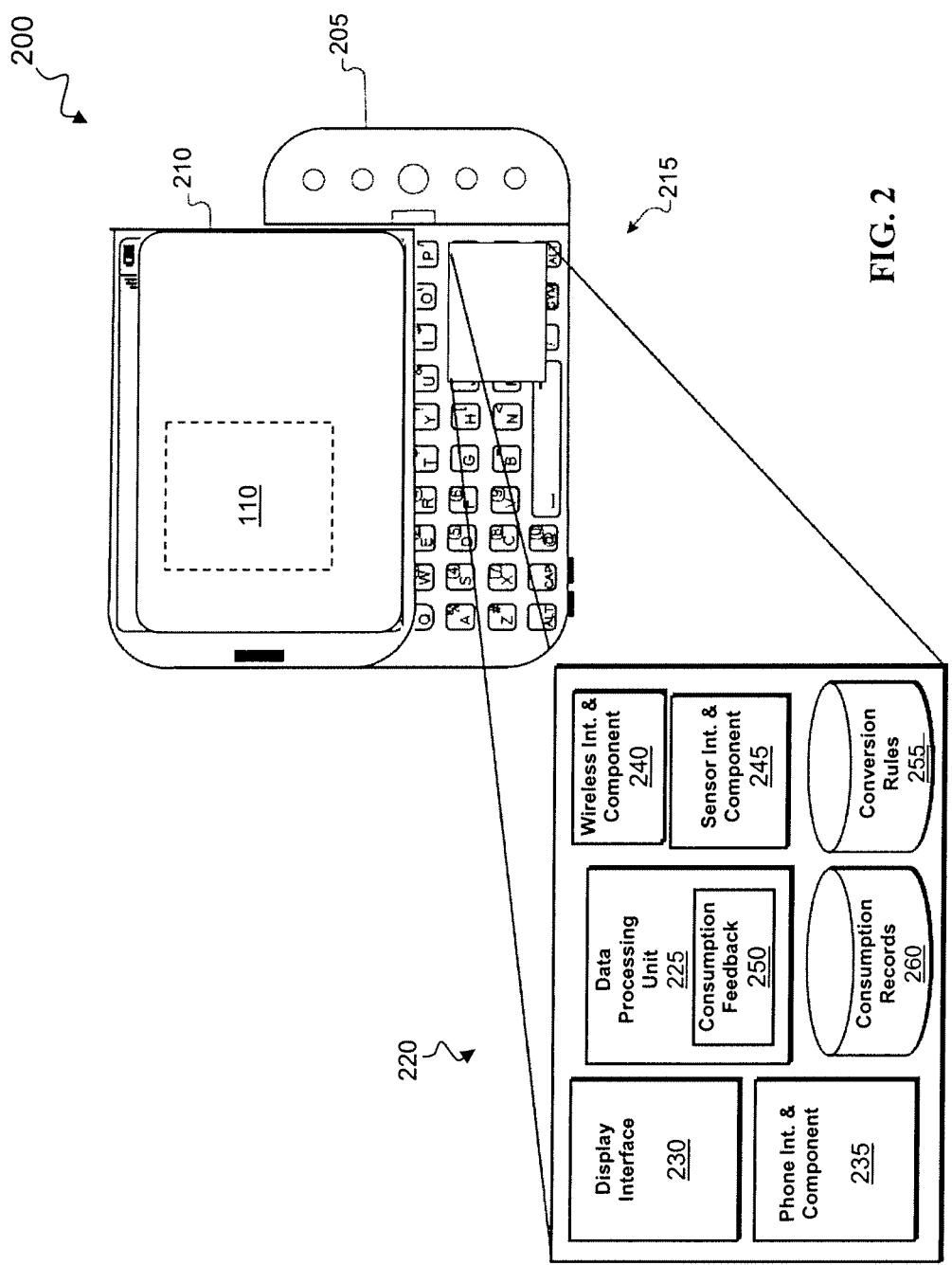
FIG. 2 is a schematic diagram of a battery-operated electronic device.

FIG. 2 is a schematic diagram of another battery-operated electronic device 200. In general, the device 200 both provides a user with functionality and allows the user to obtain information about particular power consumption by certain of the power-consuming components or applications in the device 200.

Device 200 includes a housing 205 onto which a touch screen display 210 is moveably mounted. Touch screen display 210 is moveable to expose and cover a keyboard 215. A portion of touch screen display 210 can include a power consumption feedback presentation 110 (FIG. 1). Power consumption feedback presentation 110 occupies all or a portion of touch screen display 210.

Housing 205 houses a collection 220 of electronic hardware components that cooperate to provide different functionality to the user. Electronic hardware component collection 220 includes a data processing unit 225, a display interface 230, a phone interface and component 235, a wireless interface and component 240, and a sensor interface and component 245. Data processing unit 225, interface 230, and interface and components 235, 240, 245 can be implemented in electronic circuitry, in computer software, firmware, or hardware, or in combinations of these and other elements.

Display interface 230 is a device that is configured to allow data processing unit 225 to direct the presentation of information on touch screen display 210. For example, display interface 230 can receive instructions for displaying content on touch screen display 210 from data processing unit 225. Display component 230 can translate those instructions and cause the content to be appropriately presented on touch screen display 210.

Phone interface and component 235 is a phone and an interface that is configured to allow data processing unit 225 to exchange data with the phone. Wireless interface and component 240 is a wireless transceiver and an interface that is configured to allow data processing unit 225 to exchange data with the wireless transceiver. Wireless interface and component 240 can thus communicate with other devices on a wireless network. Sensor interface and component 245 is a sensor and an interface that is configured to allow data processing unit 225 to exchange data with the sensor. The sensor can be, e.g., a hardware sensors such as an accelerometer, a compass, a global positioning system, a digital camera, or the like.

Data processing unit 225 is a device that is configured to process digital data. Data processing unit 225 can be, e.g., a generic purpose data processor that performs operations in accordance with the instructions of application and other programs. Among the operations performed by data processing unit 225 is a consumption feedback application 250.

Consumption feedback application 250 is a set of data processing activities that are designed to create an accounting of the consumption of power by different aspects of device 200 so that feedback regarding that power consumption can be provided to a user.

During the performance of the activities of consumption monitor 250, data processing unit 225 can access conversion rules 255 and write to consumption records 260. Conversion rules 255 and consumption records 260 are stored in device 200, e.g., in one or more persistent data storage devices. Various forms of persistent data storage may be provided, e.g., fixed disk drives and/or solid state memory devices. Conversion rules 255 are rules for converting characteristics of the operations performed by device 200 into a power consumption. Consumption records 260 are historical records of the power consumed by different aspects of the device and its operations. For example, consumption records 260 can provide an accounting of the power consumption by the same aspects identified and represented in account entries 120, 125, 130, 135, 140, 145, 150 (FIG. 1).

Figure 3:
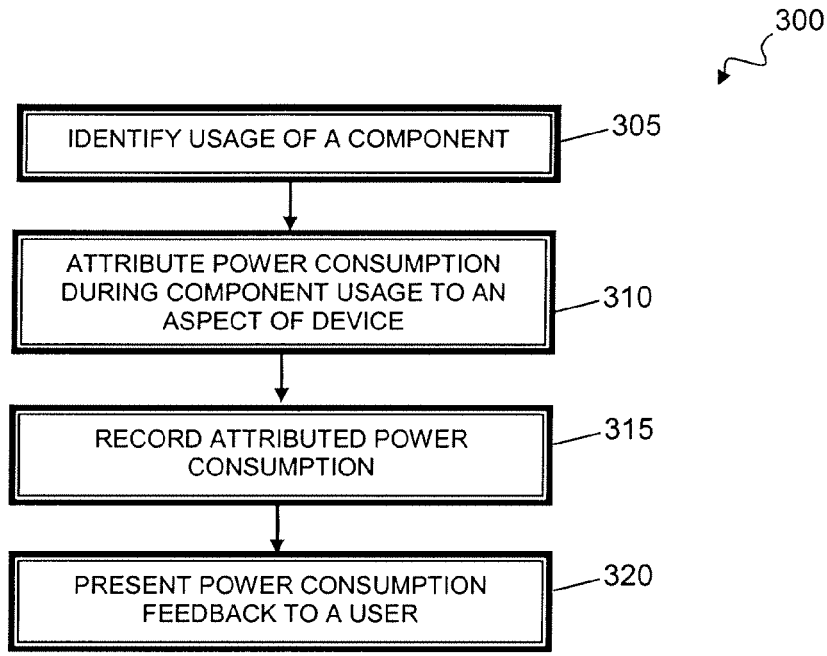
FIG. 3 is a flowchart of a process that can be performed by a battery-operated electronic device to provide a user with feedback regarding power consumption.
Figure 16:
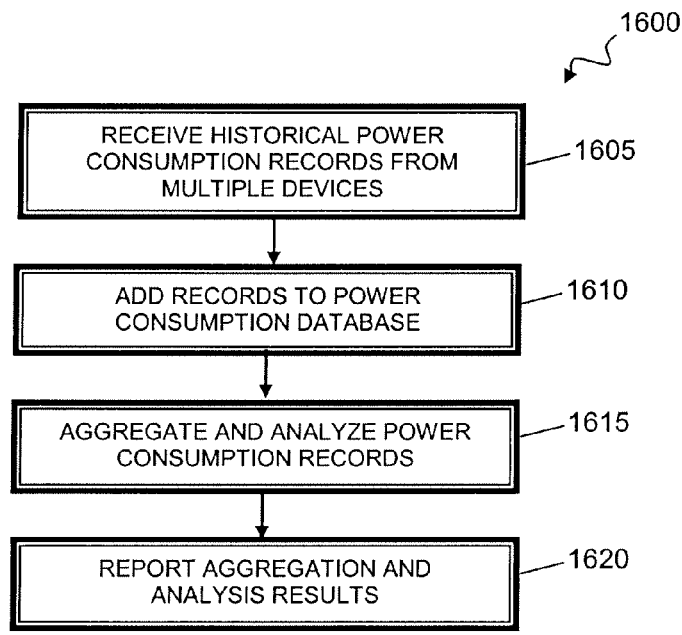
FIG. 16 is a flow chart of a process for gathering records of power consumption by applications executing on a collection of battery-operated electronic devices.

FIG. 3 is a flowchart of a process 300 that can be performed by a battery-operated electronic device or other device that performs data processing activities to provide a user with feedback regarding power consumption. Process 300 can be performed by one or more digital data processing devices that perform operations by executing one or more sets of machine-readable instructions. For example, process 300 can be performed by data processing unit 225 executing consumption feedback application 250 in device 200 (FIG. 2). As another example, process 300 can be performed by server system 1260 using power consumption and application usage information received from a collection of battery operated devices 1205 (FIG. 12), as discussed further below. Process 300 can be performed in isolation or in conjunction with other digital data processing operations. For example, in some implementations, process 300 can be performed prior to adding power consumption records to a power consumption database at block 1610 in process 1600 (FIG. 16).

Figure 13:
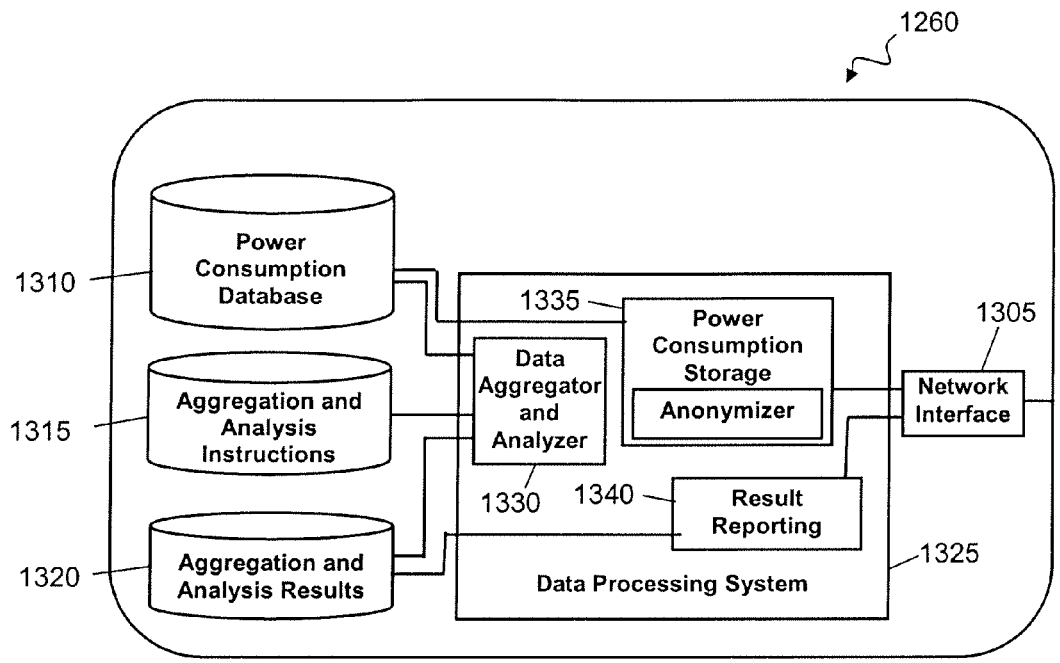
FIG. 13 is a schematic representation of an implementation of the server system of FIG. 12.

The device performing process 300 can identify the usage of a hardware component of a battery-operated device at block 305. The usage of a hardware component can be identified, e.g., by monitoring power drawn by the hardware component, by monitoring for activities performed by applications with the component, or by monitoring for messages such as instructions to the hardware component or descriptions of the activities from the applications themselves, or by extracting usage information from messages received from devices that perform such monitoring. For example, in the context of FIG. 2, the content of instructions sent from data processing unit 225 to one or more of interface 230 and interface and components 235, 240, 245 can be relayed to consumption feedback application 250 so that it can identify usage of the destination interfaces and components. As another example, usage information in messages received by server system 1260 from a collection of battery operated devices 1205 can be extracted by a power consumption storage module 1335 (FIG. 13).

The device performing process 300 can attribute the power consumption during the usage of the component to an aspect of the device at block 310. For example, power consumption can be attributed to a hardware component of the device (e.g., to a display screen, to a cell phone, to a transceiver, to a data processing unit, to a digital camera, or to an accelerometer or other sensor) or power consumption can be attributed to an application executed by the device (e.g., to the operating system software, to a map application, to a game application, to mail or other messaging application, to a web browser application, to a music or video player application, or to a tool application).

In some implementations, power consumption during usage of the component can be attributed to multiple aspects of the device. For example, power consumed by an accelerometer during a game can be attributed to both the accelerometer and to the game itself. As another example, the additional power that is consumed during a wake lock that is held by more than one application can be attributed to all of the holding applications, as described further below.

The device performing process 300 can record the attributed power consumption, e.g., in a persistent data storage device at block 315. For example, the device can record an estimate or a measurement of the amount of power that was consumed during the component usage in association with an identifier of the aspect to which that usage was attributed in a data table or other data structure. Such recording can in effect create a historical record of the power consumption by different aspects of the device.

The device performing process 300 also presents feedback regarding the power consumption of the device to a user at block 320. For example, in some implementations, the system can present one or more of power consumption feedback presentation 110 (FIG. 1), and power consumption feedback presentations 1105, 1110 (FIG. 11) to present feedback regarding power consumption by different aspects of an electronic device.

Figure 4:
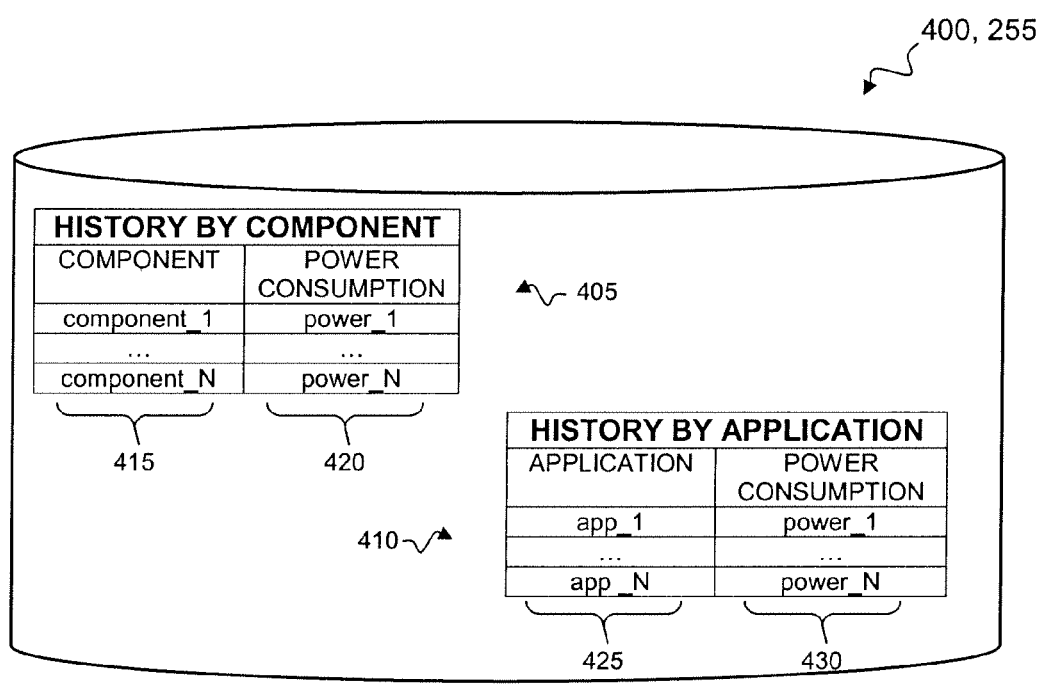
FIG. 4 is a schematic representation of a record of the power consumption by different aspects of an electronic device.

FIG. 4 is a schematic representation of a record 400 of the power consumption by different aspects of an electronic device. Record 400 can be used as consumption records 260 in electronic device 200 (FIG. 2) and can be formed during block 315 in process 300 (FIG. 3).

Record 400 includes a history by component table 405 and a history by application table 410. History by component table 405 is a data structure that associates identifiers of the components to which power consumption is attributed in a column 415 with information describing the amount of power attributed to those respective components in a column 420. History by application table 410 is a data structure that associates identifiers of the applications to which power consumption is attributed in a column 425 with information describing the amount of power attributed to those respective applications in a column 430. The information stored in record 400 can be accessed by data processing unit 225 during data processing activities such as consumption feedback application 250 (FIG. 2).

Figure 5:
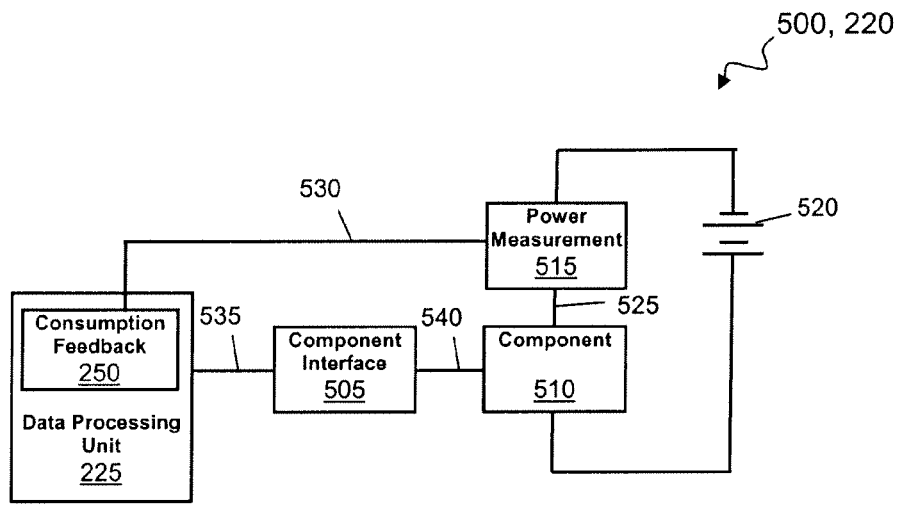
FIG. 5 is a schematic representation of a system that implements a hardware-based approach for identifying and attributing usage of a hardware component of a battery-operated electronic device.

FIG. 5 is a schematic representation of a system 500 that implements a hardware-based approach for identifying and attributing usage of a hardware component of a battery-operated electronic device. In addition to a data processing unit 225 that executes a consumption feedback application 250, system 500 also includes a component interface 505, a component 510, and a power measurement unit 515. Component interface 505 and component 510 are components of a battery-operated electronic device. For example, Component interface 505 and component 510 can be, e.g., display interface 230 and display 210 or any of interface and components 235, 240, 245 (FIG. 2).

Power measurement unit 515 is a device configured to measure the power consumed by component 510. Power measurement unit 515 can be, e.g., an ammeter that measures current flow from a battery 520 into a power terminal 525 of component 510. The power consumed by component 510 can be deduced or estimated from such a measurement based on the potential provided by battery 520. Power measurement unit 515 outputs a signal 530 representative of the measured parameter.

Data processing unit 225 exchanges information 535 with component interface 505. Information 535 can include, e.g., output requests that component 510 perform specified operations and input information characterizing the operation of component 510. Component interface 505 itself exchanges corresponding information 540 with component 510. Information 540 can include, e.g., instructions for performing the operations requested by data processing unit 225 or information from component 510 characterizing its operation.

Data processing unit 225 also receives signal 530 and conveys information describing both the source (i.e., the identity of a specific power measurement unit 515 in a system with multiple units) and the information content of signal 530 to consumption feedback application 250. Consumption feedback application 250 can use the information representative of the measured parameter to identify the usage of component 510. For example, when the power consumed by component 510 increases, consumption feedback application 250 can identify that component 510 is being used. The description of the source of signal 530 that can be used to attribute that power increase to component 510.

In some implementations, consumption feedback application 250 includes an application monitor module or other software mechanism for attributing the power increase at component 510 to specific applications executed by data processing unit 225. For example, consumption feedback application 250 can monitor the amount of information displayed on display screen 210 by different applications and attribute the power usage by display screen 210 to those applications.

In some implementations, power measurement unit 515 measures power consumed by both component interface 505 and component 510. In such cases, signal 530 represents combined measurements. The combined measurements can be attributed to component 510 or to an application executed by data processing unit 225 in the same manner as individual measurements. Such combined measurements are particularly relevant where the power consumption by component interface 505 is not negligible in comparison to the power consumption at component 510.

Figure 6:
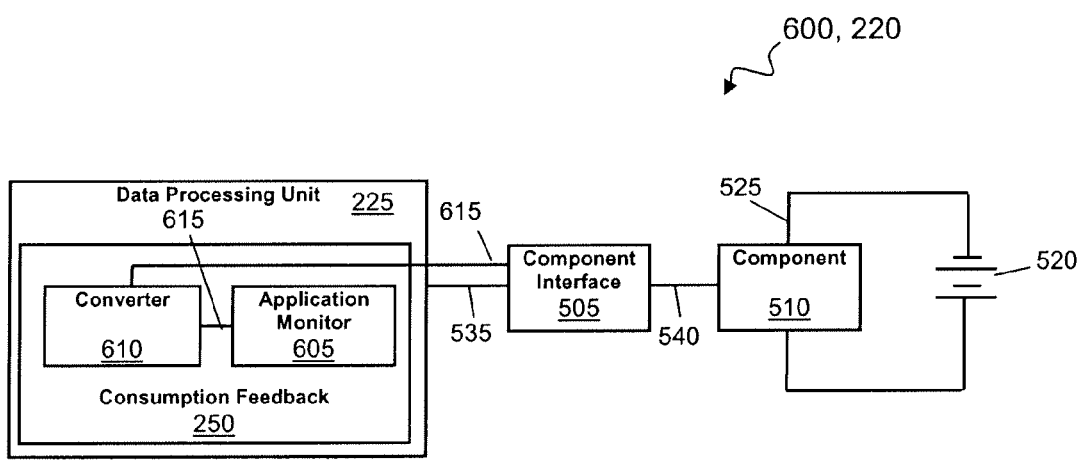
FIG. 6 is a schematic representation of a system that implements a software-based approach for identifying and attributing usage of a hardware component of a battery-operated electronic device.

FIG. 6 is a schematic representation of a system 600 that implements a software-based approach for identifying and attributing usage of a hardware component of a battery-operated electronic device. Consumption feedback application 250 includes an application monitor module 605 and a usage-to-power consumption converter module 610.

Application monitor module 605 is a set of computer program instructions that, when executed by data processing unit 225, cause data processing unit 225 to monitor the activities performed by data processing unit 225 and other components for different applications. Application monitor module 605 can, e.g., monitor the number of calculations performed by data processing unit 225 when executing an application, monitor the amount of wireless traffic generated on a component by an application (or a version of an application) (e.g., traffic over either a cellular or a WI-FI network), monitor the hold and release of wake locks by different applications, monitor the usage of accelerometers or other sensors, and the like.

Application monitor module 605 is a set of computer program instructions that, when executed by data processing unit 225, cause data processing unit 225 to convert the activities performed by components for different applications into a power consumption. In general, the conversion can yield estimates of power consumption based on estimates amount of power consumed during an activity. For example, an estimate of the amount of power consumed per unit of a certain class of wireless traffic (e.g., cellular traffic or WI-FI traffic) can be used to estimate the power consumed by the wireless traffic generated by an application (or a version of an application). As another example, an estimate of the cost to maintain an electronic device in a wake state can be used to estimate the power consumed by an application (or a version of an application) that locks the electronic device in the wake state.

Figure 7:
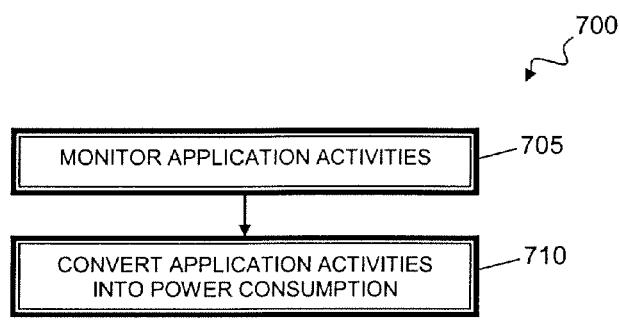
FIG. 7 is a flowchart of a process that can be performed by a battery-operated electronic device to provide a user with feedback regarding power consumption.

FIG. 7 is a flowchart of a process 700 that can be performed by a battery-operated electronic device or other device that performs data processing activities to provide a user with feedback regarding power consumption. Process 700 can be performed by one or more digital data processing devices that perform operations by executing one or more sets of machine-readable instructions. For example, process 700 can be performed by data processing unit 225 executing consumption feedback application 250 that includes a converter module 610 and an application monitor 605 (FIG. 6). Process 700 can be performed in isolation or in conjunction with other digital data processing operations. For example, process 700 can be performed at blocks 305, 310 in process 300 (FIG. 3) to identify usage of components and attribute the power consumed during such usage to different applications.

The device performing process 700 can monitor the activities that are performed when executing different applications at block 705. The activities can be attributed to the executed application. For example, the computational requirements of processes used by an application (or a version of an application) can be monitored and the process activities can be attributed to that application. As another example, the network traffic generated when executing a browser application can be monitored and the traffic can be attributed to the browser.

The device performing process 700 can convert the activities of the different applications into a power consumption at block 710. The conversion can yield estimates of the amount of power consumed by the different applications and can be performed using rules for converting the activities into a power consumption, such as conversion rules 255 (FIG. 2). The rules for converting the activities into a power consumption can be based on estimates of the power required by different components to perform different activities. In some implementations, these power consumption estimates can be a function of the operating conditions of the components.

Figure 8:
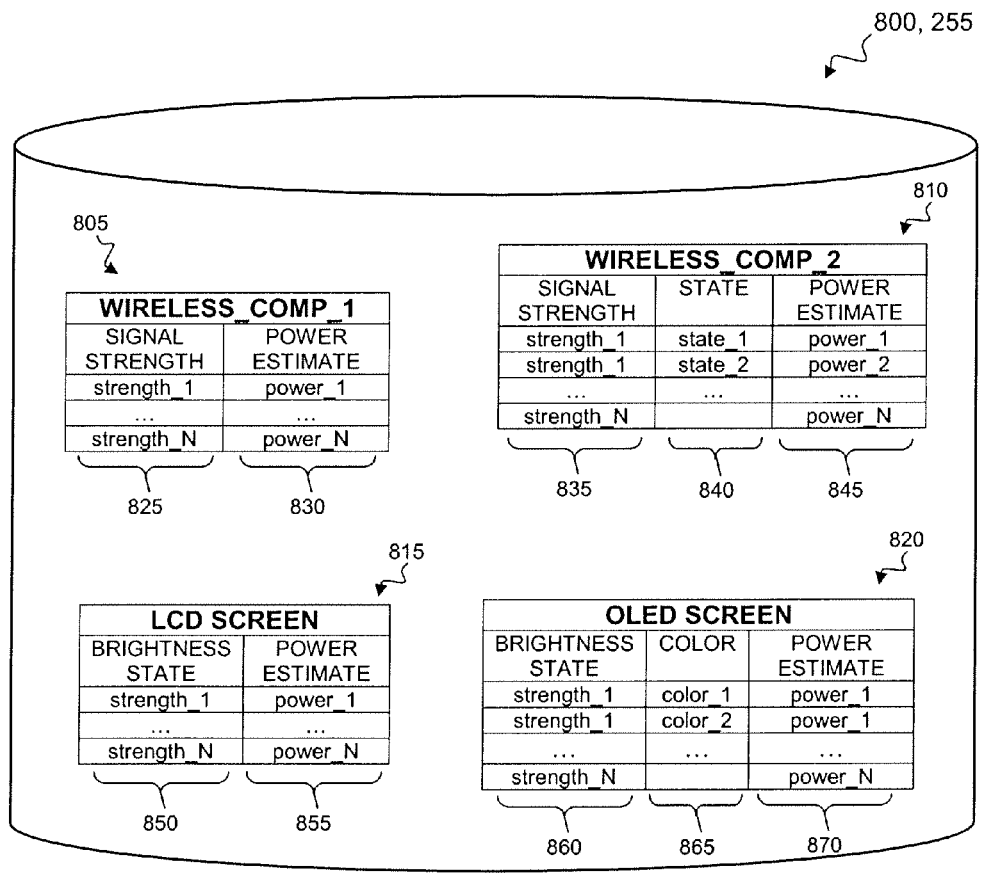
FIG. 8 is a schematic representation of a collection of estimates of the power required by different components to perform different activities.

FIG. 8 is a schematic representation of a collection 800 of estimates of the power required by different components to perform different activities. Estimate collection 800 can express or be used in conjunction with conversion rules 255 in electronic device 200 (FIG. 2).

Estimate collection 800 includes one or more data structures that store information that characterizes estimates of the power consumption by different components under different operating conditions. In the illustrated example, estimate collection 800 includes a first wireless component table 805, a second wireless component table 810, an LCD screen table 815, and an OLED screen table 820.

First wireless component table 805 includes a pair of columns 825, 830. Column 825 includes information identifying different ranges of signal strength under which a first wireless transceiver component operates. Column 830 includes estimates of the power consumed by the transmission or the reception of a signal by the first wireless component when operating under the corresponding range of signal strength in column 825. The estimates can be expressed, e.g., per unit time that the first wireless component is transmitting or receiving information or per amount of data that is transmitted or received by the first wireless component.

Second wireless component table 810 includes a collection of columns 835, 840, 845. Column 835 includes information identifying different ranges of signal strength under which a second wireless transceiver component operates. Column 840 includes information identifying various states in which the second wireless transceiver component operates. For example, the information in column 840 can identify scanning states, multicast states, or other states of the second wireless transceiver. Column 845 includes estimates of the power consumed by the transmission or the reception of a signal by the second wireless component when operating in the corresponding state in column 840 under the corresponding range of signal strength in column 835. The estimates can be expressed, e.g., per unit time that the second wireless component is transmitting or receiving information or per amount of data that is transmitted or received by the second wireless component.

Liquid crystal display (LCD) screen table 815 includes a pair of columns 850, 855. Column 850 includes information identifying various states in which an LCD screen operates. For example, the information in column 850 can identify different brightness levels of the LCD screen and its backlight. Column 855 includes estimates of the power consumed by LCD screen when operating at the corresponding brightness in column 850.

Organic light-emitting diode (OLED) screen table 820 includes a collection of columns 860, 865, 870. Column 860 includes information identifying various states in which an OLED screen display operates. For example, the information in column 860 can identify different brightness levels of the OLED screen display. Column 860 includes information identifying the colors in which an OLED screen display. The power consumed by an OLED screen display is a function of the number and color of illuminated pixels. Column 870 includes estimates of the power consumed by LCD screen when illuminating pixels of the corresponding color in column 865 at the corresponding brightness in column 850.

The following are examples of how the performance of activities on different components can be converted into a power consumption that can be attributed to that component or to an application.

Data Processing Unit 225: In some implementations, the number of cycles executed by different processes over a period of time (or a related parameter that reflects computational intensity) can be measured. The measurement result can then be multiplied by a factor that embodies the power usage per unit time.

Wireless Transceivers: The power consumed by a wireless transceiver is a function of the type of transceiver and its signal strength. The data transmission and reception activities of each wireless transceiver in an electronic device can be assigned to a different bin according to an average signal strength during those activities. In other words, there may be a total of N*Y bins in an electronic device, wherein N is the number of wireless transceivers and Y is the number of signal strength ranges. For example, there may be five different ranges of signal strength for each wireless transceiver. Each time the data transmission and reception activities of the electronic device switch between bins, the data transmission and reception activity assigned to the former bin can be multiplied by an estimate of the power drawn by a transceiver operating within the corresponding range of signal strength. This estimate of the power consumption can be attributed to one or both of:

- the wireless transceiver and added to the amount of power attributed to that wireless transceiver in a column 420 of table 405 (FIG. 4), and
- the application for which the transmission and reception activities were performed and added to the amount of power attributed to that application in a column 430 of table 410 (FIG. 4).

Wake Lock Usage: A wake lock is a lock that is held by an application (or a version of an application) to prevent a data processing unit from entering a sleep or other power saving mode. As a result, the data processing unit consumes power that would not have been consumed had the power saving mode been entered. Multiple applications may hold a wake lock at the same time. In converting the holding of a wake lock into a power consumption that can be assigned to an application, each request or release of a wake lock by an application (or a version of an application) can be taken as a trigger demarcating the end of a period. The total power consumption for that period can be determined by multiplying the duration of the period by the power that was not saved as a result of the data processing unit not entering a power saving mode. This total power consumption can then be divided by the number of applications that held the wake lock during the period and the resulting quotient can be attributed to those applications in a column 430 of table 410 (FIG. 4).

Hardware Sensors such as accelerometers, compasses, digital cameras, global positioning systems, and the like: Applications that use such sensors can be required to request that the data from the sensor be delivered to the applications. In the absence of a request, hardware sensors can remain inactive. The requests can be used as the basis for attributing power consumption by the sensor to different applications. Since multiple applications may request to receive the data from a sensor at the same time, periods can be demarcated based on requests and the total power consumption for each period can be distributed among the applications that receive sensor data during each period.

LCD Screen and Backlight: The display of graphics by an LCD screen and its backlight can be converted into a power consumption by multiplying the duration of a period in which the LCD screen and its backlight are within a brightness range by an estimate of the power consumed within that brightness range per unit time.

In implementations where the power consumption is be assigned to the LCD screen and its backlight as components, Equation 1 can be used:

$$P_{LCD} = \sum_{i=1}^{n} t_i E_i + BE \sum_{i=1}^{n} t_i \qquad \text{Equation 1}$$

where "$P_{LCD}$" is the power consumption is be attributed to the LCD screen and its backlight; "$t_i$" is the duration of a period "i;" "$E_i$" is an estimate of the excess power consumed by the LCD screen and its backlight during each period "i" (i.e., in excess of a baseline estimate "BE" of the power consumed by the LCD screen and its backlight at the lowest brightness); and there are "n" periods of operation by the LCD screen and its backlight.

In implementations where the power consumption by the LCD screen and its backlight is to be assigned to an application, Equation 2 can be used:

$$P_{LCD} = t_i E_i \quad \text{Equation 2}$$

wherein "$P_{app}$" is the power consumption is be attributed to the application for a period "i" of a duration "$t_i$," and "$E_i$" is an estimate of the excess power consumed by the LCD screen and its backlight during period "i."

OLED Display Screen: The display of graphics by an OLED display screen can be converted into a power consumption by counting the number of pixels at certain colors and brightnesses and multiplying the number by an estimate of the power needed to maintain a pixel at that color and brightness. In some implementations, the color, the brightness, or both the color and brightness of groups of pixels can be averaged (e.g., by smoothing pixels using, e.g., bi-linear interpolation) and the average(s) can be multiplied by an estimate of the power needed to maintain that group of pixels at the average(s). Such estimates of power consumption can be attributed to the OLED display screen or to the application(s) that present graphical images on the OLED display screen.

Phone Radio in an Idle State: Maintaining the phone radio in an idle state can be converted into a power consumption by multiplying the duration of different periods in which the signal strength is within a certain range by an estimate of the power consumed within that signal strength range per unit time. In implementations where the power consumption is be assigned to the phone radio as a component, Equation 3 can be used:

$$P_{idle} = \sum_{i=1}^{n} t_i E_i + BE \sum_{i=1}^{n} t_i \quad \text{Equation 3}$$

where "$P_{idle}$" is the power consumption is be attributed to an idle phone radio as a component; "$t_i$" is the duration of each idle period "i;" "$E_i$" is an estimate of the excess power consumed by the phone radio during each idle period "i" (i.e., in excess of a baseline estimate "BE" of the power consumed by the phone radio at the highest signal strength range); and there are "n" idle periods of the phone radio within different signal strength ranges.

Calling with the Phone Radio: Calling with the phone radio can be converted into a power consumption by multiplying the duration of different calling periods in which the signal strength is within a certain range by an estimate of the power consumed within that signal strength range per unit time calling.

WI-FI transceiver (i.e., transceivers based on the IEEE 802.11 standards): The power consumed by a WI-FI transceiver is a function of signal strength and state (e.g., scanning, multicast, etc.). The data transmission and reception activities of a WI-FI transceiver can be assigned to a different bin according to an average signal strength of those activities in that state. In other words, there may be a total of M*Z bins in an electronic device, wherein M is the number of signal strength ranges and Z is the number of different states. Estimates of the power consumption can be attributed to one or both of:

the WI-FI transceiver itself and added to the amount of power attributed to that WI-FI transceiver in a column 420 of table 405 (FIG. 4), and the application for which data transmission and reception activities were performed and added to the amount of power attributed to that application in a column 430 of table 410 (FIG. 4).

Audio and Video Components such as headphones, dedicated decompression hardware, and the like: Applications that use audio and video components can be required to request that the audio and video components be activated for use. In the absence of a request, audio and video components can remain inactive. The requests can be used as the basis for attributing power consumption by the audio and video components to different applications.

Figure 9:
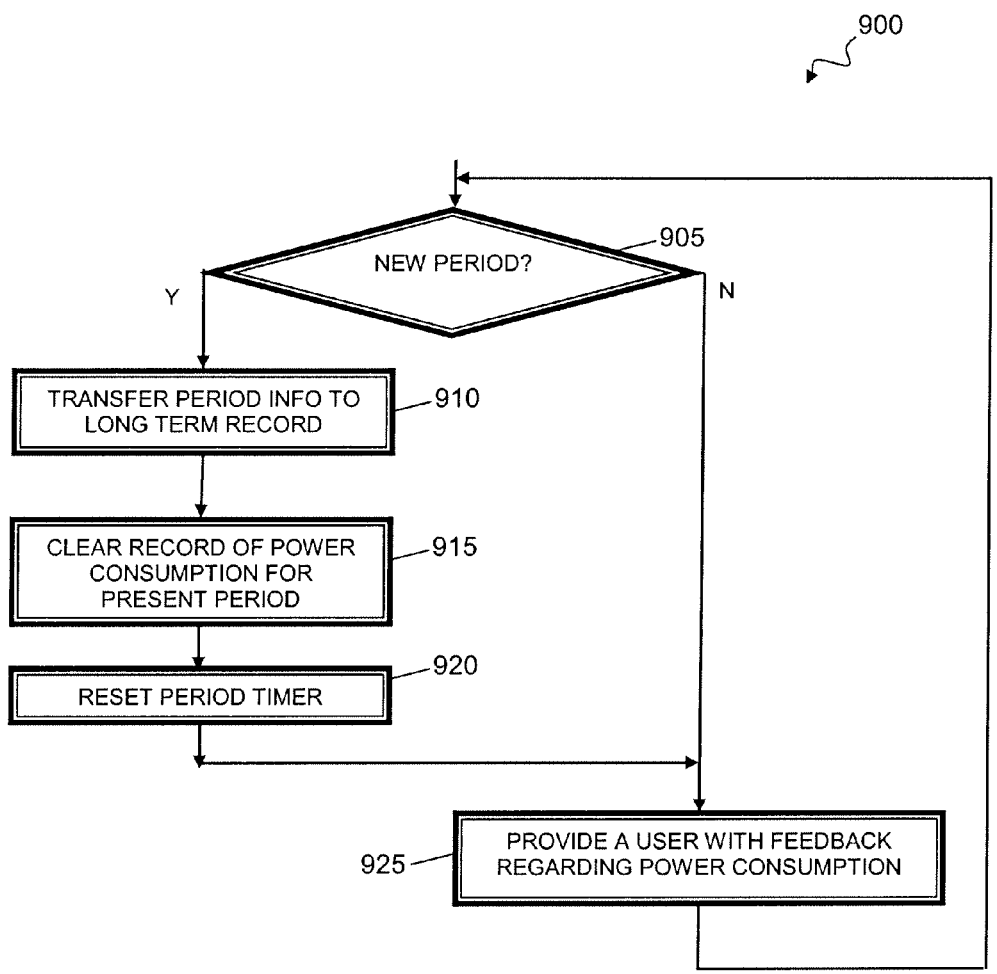
FIG. 9 is a flowchart of a process that can be performed by a battery-operated electronic device to provide a user with feedback regarding power consumption.

FIG. 9 is a flowchart of a process 900 that can be performed by a battery-operated electronic device or other device that performs data processing activities to provide a user with feedback regarding power consumption. Process 900 can be performed by one or more digital data processing devices that perform operations by executing one or more sets of machine-readable instructions. For example, process 900 can be performed by data processing unit 225 executing a consumption feedback application 250 (FIG. 2). Process 900 can be performed in isolation or in conjunction with other digital data processing operations. For example, process 900 can perform process 300 in order to provide a user with feedback regarding power consumption in the present period at block 925, as described further below (FIG. 3).

The device performing process 900 can determine whether a new period is starting at decision block 905. Different periods can be delineated, e.g., by the electronic device being turned on or off, charging of the electronic device being started or ended, the user of the electronic device switching, or by other occurrences. The start of a new period can be identified, e.g., by sensing power-up or power down of the device, sensing the beginning or ending of battery charging, a change in the user who is logged into the device, or the receipt of a manual trigger that identifies the start of a new period.

In response to determining that a new period has started, the device performing process 900 can transfer information describing the power consumption by different aspects of the electronic device during the period that ended into a long term record of power consumption at block 910. The power consumption information for the present period can be added to a longer term record of power consumption in order to document to power consumption by different aspects of the device over extended periods. The actual term of the long term can be, e.g., a calendar period (e.g., a week, a month, or a year) or the lifespan of the electronic device.

Figure 10:
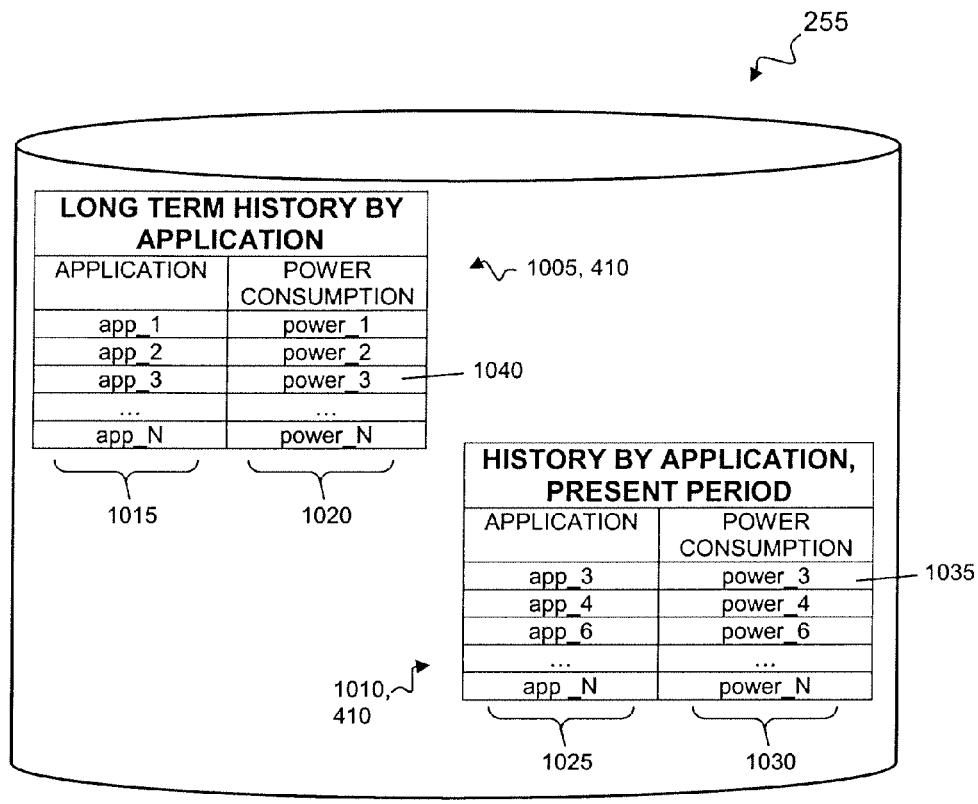
FIG. 10 is a schematic representation of a long term record of power consumption by different applications, as well as a record the power consumption for the present period by different applications.

FIG. 10 is a schematic representation of a long term record 1005 of power consumption by different applications, as well as a record 1010 of the power consumption for the present period by different applications.

Long term record 1005 is a data structure that associates identifiers of the applications to which power consumption is attributed in a column 1015 with information describing the amount of power that has been attributed to those respective applications over a long term in a column 1020. Present period record 1010 is a data structure that associates identifiers of the applications to which power consumption is attributed in a column 1025 with information describing the amount of power that has been attributed to those respective applications over the present period in a column 1030. The applications identified in columns 1015, 1025 can be different applications or different versions (e.g., release 1.0, 1.2, 2.0, . . . ) of the same application. Either present period record 1010 or long term record 1005 can implement history by application table 410 (FIG. 4).

In transferring power consumption information from present period record 1010 to long term record 1005, a data processing device can add the power consumption attributed to an application in the present period to the power consumption attributed to an application over the long term. For example, in the illustrated implementation, the power consumption attributed to an application "app_3" in the present period (i.e., field 1035 in column 1030) can be added to the power consumption attributed to that same application "app_3" over the long term (i.e., field 1040 in column 1020). As shown, power consumption will generally be attributed to more applications over the longer term than in the present period.

Returning to FIG. 9, the device performing process 900 can also clear a record describing the power consumption by different aspects of the electronic device during the present period at block 915. For example, both the identifiers of the applications in column 1025 and the information describing the amount of power that has been attributed to those respective applications in column 1030 can be cleared from a present period record 1010 (FIG. 10).

The device performing process 900 can also reset a period timer in response to determining that a new period has started at block 920. Such a period timer can be used to present text or other information 155 that identifies the period of time for which power consumption feedback is present in feedback presentation 110 (FIG. 1).

The device performing process 900 can also provide a user with feedback regarding power consumption at block 925. For example, the device can perform process 300 (FIG. 3), with or without process 700 (FIG. 7) in order to provide feedback regarding the power consumption in the present period. As another example, the device can provide feedback regarding the long term power consumption by aspects of the electronic device.

Figure 11:
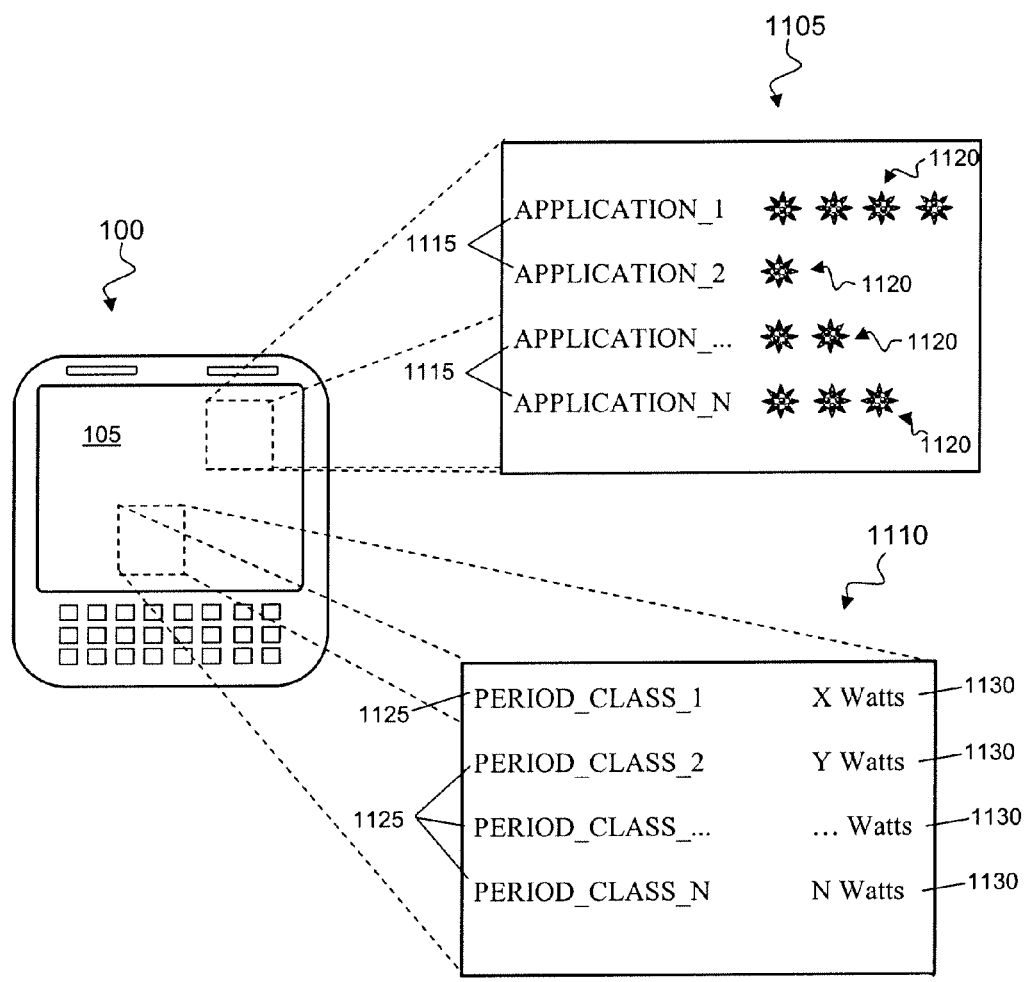
FIG. 11 is a schematic representation of how a user can be provided with feedback regarding power consumption by aspects of a battery-operated electronic device.

FIG. 11 is a schematic representation of how a user can be provided with feedback regarding power consumption by aspects of a battery-operated electronic device 100.

Portions of display screen 105 include power consumption feedback presentations 1105, 1110. Power consumption feedback presentation 1105 includes a collection of application identifiers 1115 that are each associated with a respective power rating indicium 1120. Application identifiers 1115 identify applications that can be or have been executed on the electronic device. For example, application identifiers 1115 can identify applications that are available to be downloaded from an application developer or supplier. The applications identified by identifiers 1115 can be different applications or different versions (e.g., release 1.0, 1.2, 2.0, . . . ) of the same application. Power rating indicia 1120 are pictorial symbols or other indicia that indicate the amount of power consumed by the identified applications.

The power consumption represented by power rating indicia 1120 can be determined in a number of ways. For example, in some implementations, the amount of power consumed by an application (or a version of an application) can be determined from a long term record of the power consumption by that application, such as long term record 1005 (FIG. 10). Power rating indicia 1120 can thus indicate the amount of power consumed by the identified applications as executed on that same electronic device. As another example, in some implementations, power rating indicia 1120 can be determined from records of the power consumption by that application on one or more other devices. For example, a developer or supplier can collect records of power consumption by an application (or a version of an application) that has executed on a collection electronic devices. These collected records can then be used to determine an average power consumed by the application and to generate a power rating for the application.

Records of power consumption by applications are particularly relevant when applications can be developed by multiple developers. In particular, different developers may have different levels of expertise and may develop similar applications that consume different amounts of power. When the amount of power consumed by the different applications is rated, a user can consider power consumption as a factor in deciding whether to install or execute an application. This is especially true when different applications that have similar functionality and one application can be considered as a substitute for the other.

Power consumption feedback presentation 1110 includes a collection of identifiers 1125 of different classes of periods that are each associated with a respective power indicium 1130. Identifiers 1115 identify different classes of periods of time when electronic device 100 is in use. For example, a class of periods may occur at certain hours during the day (e.g., "noon-2 PM," "2 PM-4 PM"), a class of periods may occur when electronic device 100 is used by specific users ("Jeanne," "Julie"), or the like. Power indicia 1130 include text or other indicia that indicates the average amount of power consumed during the identified classes of periods. The power consumption represented by power indicia 1130 can be determined in a number of ways. For example, in some implementations, a number different long term records of power consumption can be created, with each long term record associated with a different class. In response to a new period starting, the power consumption records for the former period can be transferred to the records dedicated to periods of this class.

Figure 12:
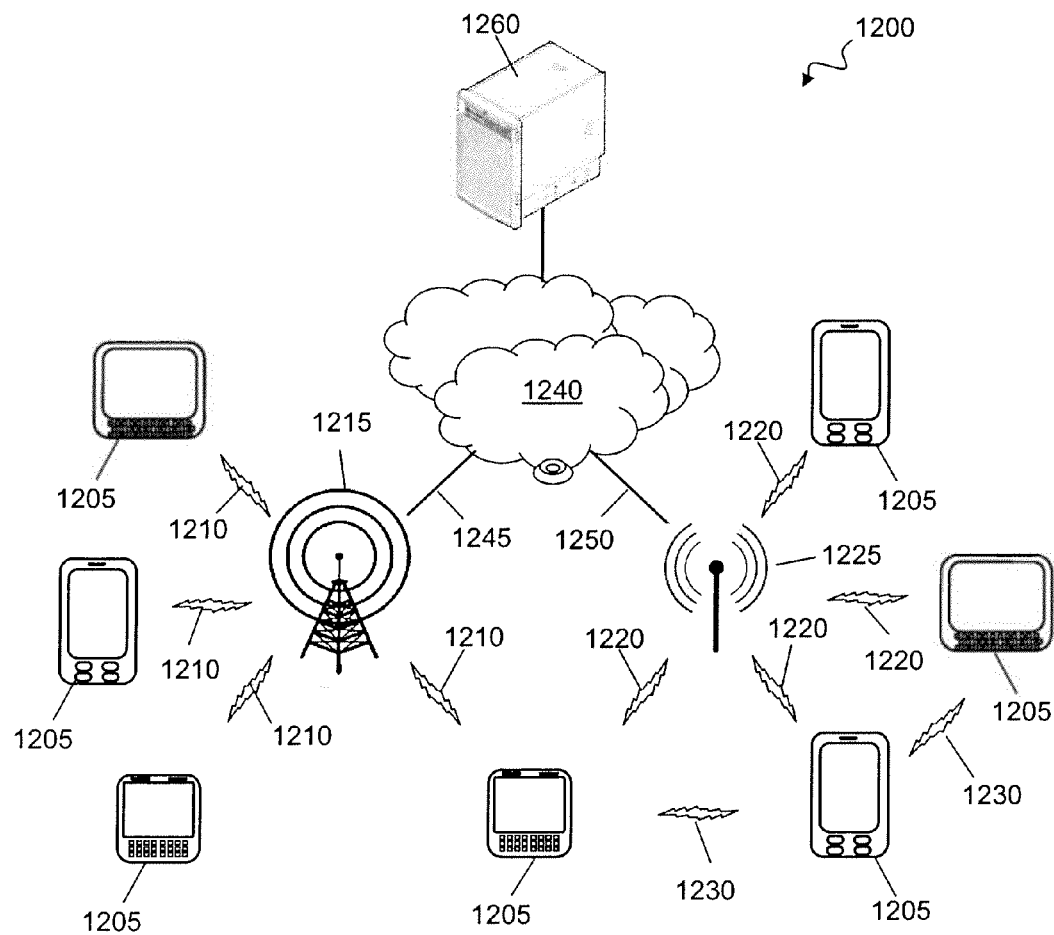
FIG. 12 is a schematic representation of a system which can gather records of power consumption by applications executing on a collection of electronic devices.

FIG. 12 is a schematic representation of a system 1200 that can collect records of power consumption by applications executing on a collection of electronic devices. System 1200 includes a collection of battery-operated electronic devices 1205 that are each associated with different users. Battery-operated electronic devices 1205 are generally handheld, mobile devices that each includes one or more wireless or wired data communication components. Battery-operated electronic devices 1205 can belong to different device classes. For example, different battery-operated electronic devices 1205 can be different categories of devices (e.g., cell phones, personal data assistants, game players, and the like) and different makes and models of devices within each category. For example, a first device class can be a first personal data assistant model offered by a first manufacturer, a second device class can be a second personal data assistant model offered by that same manufacturer, and a third device class can be a different personal data assistant model offered by a different manufacturer.

Each battery-operated electronic device 1205 is configured to gather information regarding its own power consumption. For example, in some implementations, at least some of battery-operated electronic devices 1205 can gather information that is limited to the discharge rate of their own battery. With such devices 1205, the power consumption is not attributed to different applications or components by the devices 1205 themselves. In some implementations, battery-operated electronic devices 1205 can gather information characterizing both the discharge rate of their own battery as well as usage information characterizing the usage of applications during that discharge. However, the power consumed during discharge need not be attributed to the particular applications by battery-operated electronic devices 1205 themselves. Rather, information characterizing the discharge and usage can be transmitted to server system 1260 for attribution of the power consumption to the applications. In some implementations, at least some of the battery-operated electronic devices 1205 themselves attribute power consumption during usage to their own applications. For example, at least some of devices 1205 can be devices 100, 200.

As discussed above, each battery-operated electronic device 1205 includes one or more wireless or wired data communication components. In the illustrated implementation, each battery-operated electronic device 1205 includes one or more wireless data communication components, namely, either a mobile phone transceiver, a WiFi transceiver, or both. The mobile phone transceivers are able to exchange messages 1210 with a phone base station 1215. The WiFi transceivers are able to exchange messages 1220 with a WiFi access point 1225 and messages 1230 with peer devices 1205 that also include WiFi transceivers.

Phone base station 1215 and WiFi access point 1225 are connected for data communication with one or more data communication networks 1240 via data links 1245, 1250 and can exchange information with a server system 1260. Battery-operated electronic devices 1205 are thus also in data communication with server system 1260.

Server system 1260 is a system of one or more data processing devices that is programmed to perform data processing activities in accordance with one or more sets of machine-readable instructions. The activities can include collecting records of power consumption by battery-operated electronic devices 1205, aggregating those records into a power consumption database, and analyzing the power consumption database records. As needed, server system 1260 can also attribute that power consumption to applications executing on battery-operated electronic devices 1205. These and other activities are described in further detail below.

FIG. 13 is a schematic representation of an implementation of server system 1260 (FIG. 12). Server system 1260 includes a network interface 1305, a power consumption database 1310, a collection of aggregation and analysis instructions 1315, an aggregation and analysis result database 1320, and a data processing system 1325.

Network interface 1305 is a system of one or more components that are configured to provide data communications over one or more data communication networks, such as communication network 1240 (FIG. 12). Network interface 1305 can provide physical access to one or more networking media and in some implementations can include a physical layer device and a data link layer device.

Power consumption database 1310 is a collection of data that characterizes power consumption by different applications on a collection of different battery-operated electronic devices. For example, power consumption database 1310 can characterize power consumption by different applications on the battery-operated electronic devices of collection 1205 (FIG. 12). In general, power consumption database 1310 excludes information that identifies the particular devices and/or the users of the devices. In other words, the power consumption data in database 1310 is generally anonymized before storage.

Figures 14, 15:
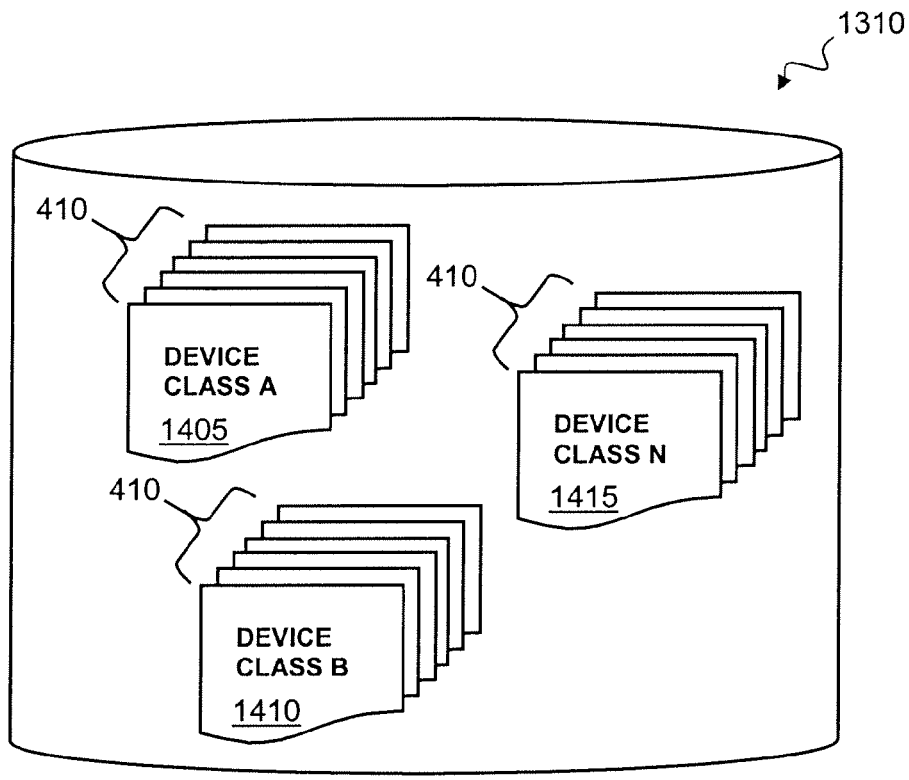
FIG. 14 is a schematic representation of one implementation of a power consumption database.
FIG. 15 is a schematic representation of a data structure in which the information content of multiple history by application tables is combined.

FIG. 14 is a schematic representation of one implementation of power consumption database 1310. Power consumption database 1310 includes collections 1405, 1410, 1415 of power consumption records. Each power consumption record collection 1405, 1410, 1415 includes power consumption records that associate identifiers of hardware or software components with a description of the power consumption attributed to those components for different battery-operated electronic devices, such as different devices 1205 in system 1200 (FIG. 12).

In the illustrated implementation, these power consumption records are history by application tables 410 that are grouped according to the class of the battery-operated electronic devices whose power consumption is characterized by the information contained therein. Thus, power consumption record collection 1405 is a group of tables 410 that characterize historical power consumption by applications executing on battery-operated electronic devices of a first class (i.e., devices belonging to "class A"). Power consumption record collection 1410 is a group of tables 410 that characterize historical power consumption by applications executing on battery-operated electronic devices of a second class (i.e., devices belonging to "class B"). Power consumption record collection 1415 is a group of tables 410 that characterize historical power consumption by applications executing on battery-operated electronic devices of yet another class (i.e., devices belonging to "class N"). As discussed above, battery-operated electronic devices can belong to a class by virtue of being a certain category, make, and/or model of device.

In other implementations, the information content of power consumption database 1410 can be organized differently. For example, the information content can be stored in different types of databases and the data structures used in those databases can be structured in a variety of different ways. For example, power consumption records can be collected in data structures that each associated with a single application or some or all of the records in individual history by application tables 410 can be combined.

FIG. 15 is a schematic representation of a data structure 1500 in which the information content of multiple history by application tables 410 is combined. In particular, for a collection of different battery-operated electronic devices belonging to a "class N," data structure 1500 associates—for a number of different devices—identifiers of applications to which power consumption is attributed in a column 1505 with the relative efficiency of the power consumption attributed to those applications in columns 1510, 1515, 1520, 1525, 1530. The applications identified in column 1505 can be different applications or different versions (e.g., release 1.0, 1.2, 2.0, . . . ) of the same application. As shown, the different devices whose power consumption is characterized will generally not all include the same applications. For example, the device "Dev_3" whose power consumption is characterized in column 1520 only includes three of the applications identified in column 1505 (i.e., app_1, app_2, and app_6), whereas the device "Dev_1" whose power consumption is characterized in column 1510 includes seven of the identified applications.

In the illustrated implementation, data structure 1500 also includes values that characterize a composite of the power consumption in different battery-operated electronic devices. In particular, a column 1535 includes information characterizing the average efficiency of power consumption attributed to the different applications in all of the battery-operated electronic devices whose power consumption is characterized individually in columns 1510, 1515, 1520, 1525, 1530. Other examples of composite values include statistical measures such as median efficiency of power consumption by multiple battery-operated electronic devices, the mode of the efficiency of power consumption of multiple battery-operated electronic devices, the range of the efficiency of power consumption by multiple battery-operated electronic devices, and measures of dispersion of such composite values, such as variances and confidence intervals.

In other implementations, such composite power consumption values are not stored at all or stored separately from the individual power consumption information. For example, in some implementations, the information content of columns 1510, 1515, 1520, 1525, 1530 can be stored in a data warehouse whereas the values in column 1535, or other composite power consumption values, are stored in an analytical database.

Such composite values can provide representative characterization of the efficiency of power consumption of different applications in different devices operated by different users. The unique particularities of power consumption by individual users can thus be accommodated.

Returning to FIG. 13, aggregation and analysis instructions 1315 is a collection of machine-readable instructions that, when implemented by data processing system 1325, cause data processing system 1325 to perform data processing activities that aggregate and analyze data characterizing power consumption by different applications on different battery-operated electronic devices. These activities can be performed by a data aggregator and analyzer module 1330 in data processing system 1325. The aggregation and analysis of data characterizing power consumption by different applications can include calculating composite values that characterize power consumption in multiple battery-operated electronic devices. Aggregation and analysis instructions 1315 can also include instructions for identifying power consumption interactions between an application and another hardware or software component, as discussed further below.

Aggregation and analysis result set 1320 is a collection of data that characterizes the results of aggregating and analyzing the power consumption by different applications characterized in power consumption database 1310. Aggregation and analysis result set 1320 can include, e.g., composite values that characterize power consumption in a group of battery-operated electronic devices as well as data characterizing power consumption interactions between an application and another hardware or software component, as discussed further below. In some implementations, aggregation and analysis result set 1320 is stored amongst other data in power consumption database 1310, as are the composite values in column 1535 in data structure 1500 (FIG. 15) discussed above.

In addition to the data processing activities of data aggregator and analyzer module 1330, data processing system 1325 can also perform a set of data processing activities as a module 1335 that manages the storage of power consumption records in power consumption database 1310 and a set of data processing activities as a module 1340 that manages the reporting of power consumption aggregation and analysis results from result set 1320.

The activities of power consumption record storage module 1335 can include receiving or otherwise collecting power consumption information from a collection of battery-operated electronic devices such as, e.g., devices 1205 (FIG. 12), over network interface 1305 and adding them to power consumption database 1310. In some implementations, the power consumption is already attributed to individual applications when received. In other implementations, power consumption record storage module 1335 itself attributes power consumption to individual applications, as discussed further below.

In some implementations, power consumption record storage module 1335 can also classify the device from which the historical power consumption information is received and add records of the attributed power consumption to power consumption database 1310 in light of that classification. In general, power consumption record storage module 1335 will also anonymize the power consumption information so that the identity of the individual battery-operated electronic devices (or the users associated with those devices) from which the historical power consumption information is received cannot be discerned from power consumption database 1310.

The activities of power consumption reporting module 1340 can extract aggregation and analysis results from result set 1320 and output them over network interface 1305. For example, in some implementations power consumption reporting module 1340 can identify particular aggregation and analysis results based on an identification of a particular electronic device class, a particular application, or both that is received over network interface 1305. In some implementations, power consumption reporting module 1340 can provide aggregation and analysis results to, e.g., a site at which different applications are available for download. As discussed further below, the reported results can be used to generate a display that characterizes the composite power consumption by an application (or a version of an application) on a single class, or on multiple classes, of battery-operated electronic devices. The reported results can also be used to generate a display that characterizes power consumption interactions on a single class, or on multiple classes, of battery-operated electronic devices.

FIG. 16 is a flow chart of a process 1600 for collecting records of power consumption by applications executing on a collection of battery-operated electronic devices. Process 1600 can be performed by one or more digital data processing devices that perform operations by executing one or more sets of machine-readable instructions. For example, process 1600 can be performed by server system 1260 (FIGS. 12, 13). Process 1600 can be performed in isolation or in conjunction with other digital data processing operations. For example, the historical power consumption records received during process 1600 can be attributed power consumption records generated by a collection of battery-operated electronic devices performing one or more of process 300, 700, 900 (FIGS. 3, 7, 9)

The device performing process 1600 receives or otherwise collects historical power consumption records from multiple battery-operated electronic devices at block 1605. The battery-operated electronic devices can be portable devices that wirelessly transmit the power consumption records to the device performing process 300. For example, in the context of system 1200, server system 1260 can receive historical power consumption records from devices 1205 over network 1240 (FIG. 12). The power consumption in the records can be attributed to applications executing on the battery-operated electronic devices or unattributed (as discussed further below).

In some implementations, the historical power consumption records can be transmitted wirelessly from the battery-operated electronic devices during a periodic "check-in" with a wireless carrier or other service provider. Such a service provider can perform process 1600 or relay the historical power consumption records to another entity that is performing process 1600.

The device performing process 1600 adds the historical power consumption records to a power consumption database at block 1610. The power consumption database can be located on one or more persistent data storage devices. For example, in the context of server system 1260, the historical power consumption records can be added to power consumption database 1310. In general, adding the historical power consumption records to a power consumption database can also include anonymizing the historical power consumption records so that the identity of the individual battery-operated electronic devices (or the users associated with those devices) from which the historical power consumption information is received cannot be discerned from the power consumption database.

The device performing process 1600 aggregates and analyzes the historical power consumption records in the power consumption database at block 1615. The aggregation and analysis can yield composite values the characterize representative power consumption by different applications in the battery-operated electronic devices from which the historical power consumption records are received. In some implementations, the aggregation and analysis can identify power consumption interactions between an application and another hardware or software component, as discussed further below.

The device performing process 1600 also reports the aggregation and analysis results at block 1620. For example, in the context of server system 1260, the aggregation and analysis results can be output over network interface 1305 by result reporting module 1340. The aggregation and analysis results can be reported, e.g., to users who are considering which applications to install on their battery-operated electronic devices, to application and hardware developers who are interested in reducing power consumption, or to a provider of battery-operated electronic devices so that the provider can determine whether to endorse or approve of an application. The reporting the aggregation and analysis results thus can provide a variety of different users with feedback regarding power consumption in battery-operated electronic devices.

Figure 17:
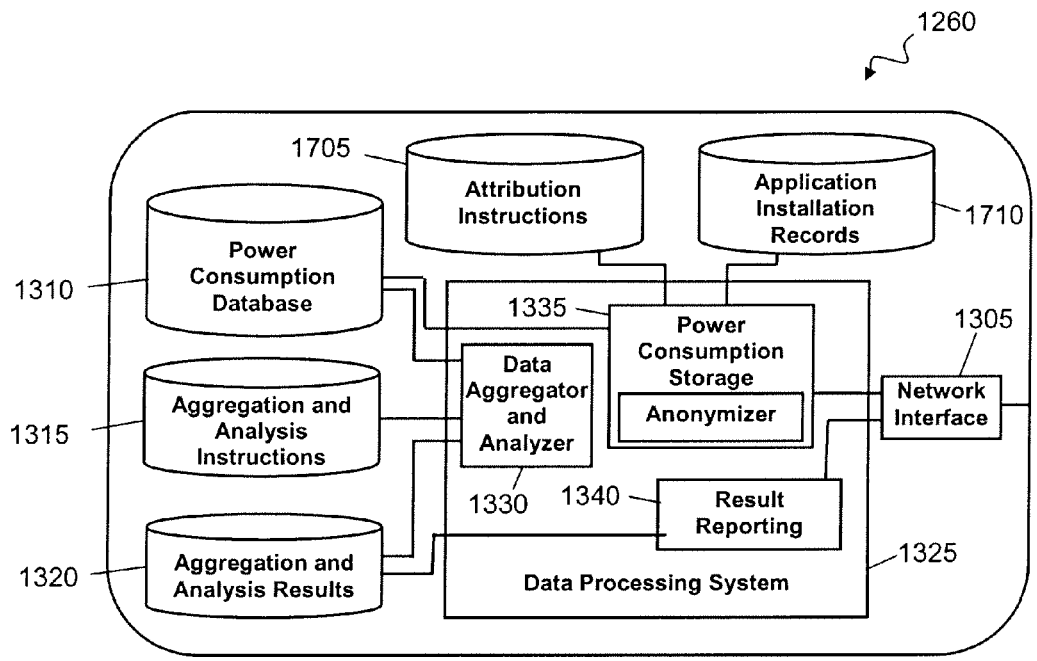
FIG. 17 is a schematic representation of another implementation of the server system of FIG. 12.

FIG. 17 is a schematic representation of another implementation of server system 1260. In addition to network interface 1305, power consumption database 1310, aggregation and analysis instruction collection 1315, aggregation and analysis result database 1320, and data processing system 1325, the illustrated implementation of server system 1260 also includes a collection of attribution instructions 1705 and application installation records 1710.

Attribution instruction collection 1705 is a collection of machine-readable instructions that, when implemented by data processing system 1225, cause data processing system 1225 to perform data processing activities that attribute the power consumption at battery-operated electronic devices to different applications executing on those devices. In general, these data processing activities are performed by power consumption storage module 1335 in data processing system 1325 prior to any anonymizing and storage of historical power consumption records in power consumption database 1310. However, in some implementations, unattributed historical power consumption records are stored in power consumption database 1310 and data aggregation and analysis module 1330 attributes the power consumption to different applications after retrieval from power consumption database 1310.

Application installation records 1710 are a collection of data that characterizes the applications installed on the different battery-operated electronic devices from which unattributed historical power consumption records are received. Application installation records 1710 can associate identifiers of the electronic devices with identifiers of the applications installed on those devices and the dates on which those applications were installed. In some implementations, application installation records 1710 can also include usage information characterizing the usage of the applications installed on those devices. For example, such usage information can characterize the amount of time that an application is active, the activities performed with the application while it is active, or the duration of periods when applications are used at the same time.

In some implementations, the information in application installation records 1710 can be gathered by tracking the download of applications to the different battery-operated electronic devices using, e.g., a server data processing system where the applications are available for download. Usage information can be gathered, e.g., from the battery-operated electronic devices themselves. For example, in some implementations, usage information can be received along with historical power consumption records during a periodic "check-in."

Figure 18:
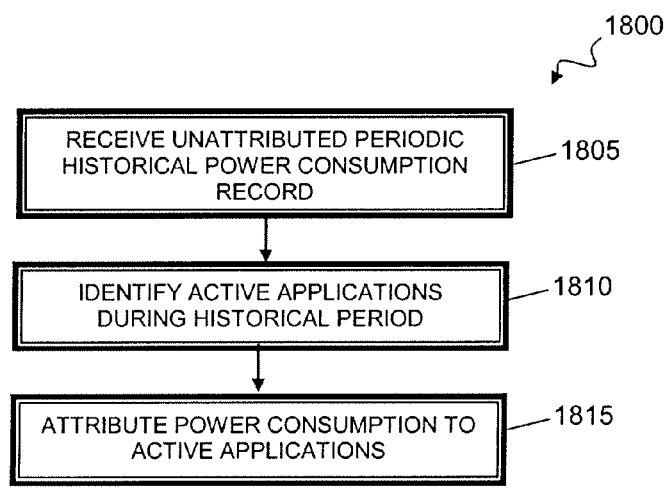
FIG. 18 is a flow chart of a process for gathering records of power consumption by applications executing on a collection of battery-operated electronic devices.

FIG. 18 is a flow chart of a process 1800 for gathering records of power consumption by applications executing on a collection of battery-operated electronic devices. Process 1800 can be performed by one or more digital data processing devices that perform operations by executing one or more sets of machine-readable instructions. For example, process 1800 can be performed by server system 1260 (FIGS. 12, 13). Process 1800 can be performed in isolation or in conjunction with other digital data processing operations. For example, process 1800 can be performed on historical power consumption records that are received at block 1605 in process 1600 (FIG. 16).

The device performing process 1800 receives an unattributed historical power consumption record from a battery-operated electronic device at block 1805. An unattributed historical power consumption record is a historical record of power consumption that has not been attributed to a particular application. A battery discharge rate that characterizes power consumption of a battery-operated electronic device as a whole is one example of an unattributed historical power consumption record. The operating time of a hardware component of a battery-operated electronic device—without attribution of that time to a particular application—is another example of an unattributed historical power consumption record. The unattributed historical power consumption record can be received, e.g., in a wireless transmission from a battery-operated electronic device during a periodic "check-in."

The device performing process 1800 identifies applications that were active on the battery-operated electronic device from which the unattributed historical power consumption record was received during the historical period that is characterized in the record at block 1810. The applications can be identified in a number of ways. For example, usage information gathered from the battery-operated electronic device itself can be used to identify active applications. As another example, active applications can be identified from a collection of data that characterizes the applications installed on the battery-operated electronic device. For example, in the context of server system 1260, active applications can be identified from application installation records 1710 (FIG. 17) using the identity of the battery-operated electronic device from which the unattributed historical power consumption record has been received.

The device performing process 1800 attributes the power consumption characterized in the historical power consumption record to the applications that were active on the battery-operated electronic device at block 1815. The power consumption can be attributed in a number of ways.

For example, power consumption can be attributed based on a change in the applications that are active on the same device in different periods, such as when a new application is installed. For example, if a group of applications is active on a device in a first period (e.g., second week in January) and the same group plus an additional application is active in a second period (e.g., the third week in January), then any increase in power consumption by the device as a whole (or by a hardware component of the device that the additional application is known to use) can be attributed to the additional application. The time at which an application is installed can be determined, e.g., from application installation records 1710 in server system 1260 (FIG. 17)

As another example, power consumption can be attributed based on a differences in power consumption by different battery-operated electronic devices that have at least some applications in common. For example, if a group of applications is active on a first device and the same group plus an additional application is active on a second device, then any additional power consumption by the second device relative to the first device can be attributed to the additional application. The different applications which are active on different devices can be determined, e.g., from application installation records 1710 in server system 1260 (FIG. 17)

As another example, power consumption can be attributed based on different usage patterns in a single device. For example, if a first application is used relatively rarely in a first period and then relatively frequently in a second period, then any increase in power consumption by the device as a whole (or by a hardware component of the device that the additional application is known to use) can be attributed to the first application. The usage pattern of an application can be determined, e.g., from usage information that is received over network interface 1305 of server system 1260 (FIG. 17).

As another example, power consumption can be attributed by statistical analysis of power consumption and usage information from a large number (e.g., in excess of 1000, or in excess of 10,000) of devices. For example, various statistical techniques can be used to isolate the power consumption attributable to an individual application even when different applications are active on different devices for different periods.

As another example, power consumption can be attributed by server system 1260 (FIGS. 12, 13) using process 300 (FIG. 3) and power consumption and usage information received from remote devices 1205 (FIG. 12).

Figure 19:
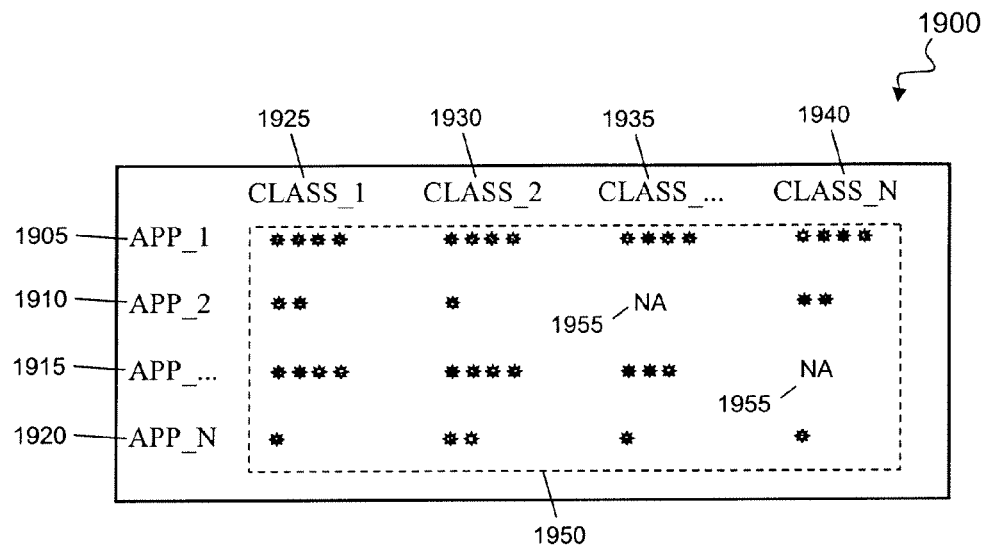
FIG. 19 is a schematic representation of a power consumption feedback presentation that provides a user with feedback regarding power consumption by applications executing on a collection of battery-operated electronic devices.

FIG. 19 is a schematic representation of a power consumption feedback presentation 1900 that provides a user with feedback regarding the efficiency of power consumption by applications executing on a collection of battery-operated electronic devices. The feedback provided by presentation 1900 can be based on historical power consumption records gathered by a system such as server system 1260 in system 1200 (FIG. 12) using methods such as process 1600 (FIG. 16) and/or process 1800 (FIG. 18). For example, power consumption feedback presentation 1900 can be output from server system 1260 directly to a battery-operated electronic device 1205 over network interface 1305. As another example, the information in power consumption feedback presentation 1900 can be output to an intermediary server system that serves power consumption feedback presentation 1900 to a battery-operated electronic device 1205.

Power consumption feedback presentation 1900 includes a collection of different application identifiers 1905, 1910, 1915, 1920, a collection of identifiers 1925, 1930, 1935, 1940 of different classes of battery-operated electronic devices, and a collection 1950 of power rating indicia. Each application identifier 1905, 1910, 1915, 1920 identifies an application that can be or has been executed on multiple electronic devices. The applications identified by identifiers 1905, 1910, 1915, 1920 can be different applications or different versions (e.g., release 1.0, 1.2, 2.0, . . . ) of the same application. Each class identifier 1925, 1930, 1935, 1940 identifies a class of a battery-operated electronic device. Power rating indicia are pictorial symbols or other indicia that indicate the relative amount of power consumed by the identified applications on several different electronic devices in each identified class per unit operating time. The power rating indicia 1120 in collection 1950 thus embody composite values of power efficiency that are determined from records of the power consumption by the identified applications on multiple battery-operated electronic devices.

In instances where an insufficient historical power consumption records have been gathered to determine a representative efficiency of power consumption of an application on a particular device, power consumption feedback presentation 1900 can include indicia 1955 indicating that a power rating is not available.

Figure 20:
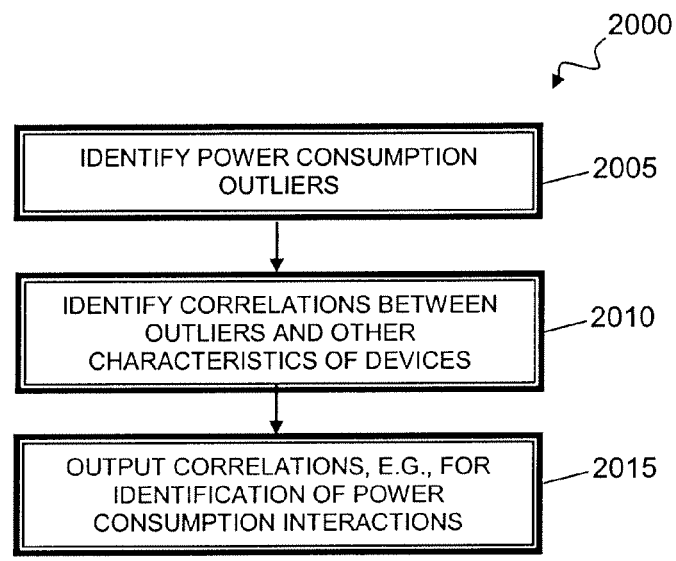
FIG. 20 is a flow chart of a process for analyzing records of power consumption by applications executing on a collection of battery-operated electronic devices.

FIG. 20 is a flow chart of a process 2000 for analyzing records of power consumption by applications executing on a collection of battery-operated electronic devices. Process 2000 can be performed by one or more digital data processing devices that perform data processing activities. For example, process 2000 can be performed by server system 1260 (FIGS. 12, 13). Process 2000 can be performed in isolation or in conjunction with other digital data processing operations. For example, process 2000 can be performed as part of the aggregation and analysis of power consumption records at block 1615 in process 1600 (FIG. 16).

The device performing process 2000 identifies one or more power consumption outliers at block 2005. Power consumption outliers are instances of power consumption by a device, an application (or a version of an application), or other element that are observably different from representative power consumption by a collection of other instances. The outliers can be identified by comparing the power consumed by one instance per unit time (i.e., the efficiency of power consumption) with the power consumed by the instance per unit time under a different set of circumstances. Such circumstances include the device on which the application was executing, the other applications which were executing on the device at that time, and the usage of the application and device. Various statistical analysis techniques can be used to identify outliers. For example, an analysis of power consumption distributions can be used to identify power consumption outliers.

Figure 21:
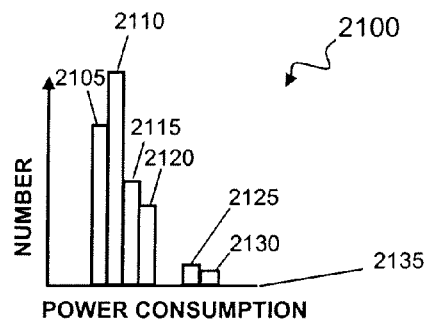
FIG. 21 schematically represents power consumption outliers on a power consumption distribution.

By way of example, FIG. 21 schematically represents power consumption outliers on a power consumption distribution, namely, a histogram 2100. In histogram 2100, instances of power consumption have been binned into bins that each encompass a range of power consumption. The instances can be instances of devices within a single class, instances of applications, instances of activities, or other instances. The bins are represented by bars 2105, 2110, 2115, 2120, 2125, 2130 positioned along an x-axis 2135 in histogram 2100. The height of each of bars 2105, 2110, 2115, 2120, 2125, 2130 represents the number count of instances within the range encompassed by a corresponding bin. The position of bars 2105, 2110, 2115, 2120, 2125, 2130 along x-axis 2135 represents the power consumption per unit time within the encompassed range under different circumstances. For example, in the illustrated implementation, bar 2110 can represent a relatively larger number of instances of power consumption by an application (or a version of an application) that occurred at a relatively lower level of power consumption, whereas bar 2125 represents that a relatively smaller number of instances of power consumption by that application occurred at a higher level of power consumption.

In histogram 2100, the instances of power consumption in the bins represented by bars 2125, 2130 can be considered power consumption outliers. In particular, the efficiency of power consumption within the ranges encompassed by bars 2125, 2130 observably differs from the efficiency of power consumption within the ranges encompassed by bars 2105, 2110, 2115, 2120. Further, the instances in the bins represented by bars 2125, 2130 are a relatively small fraction of the total number of instances represented on histogram 2100. The instances in the bins represented by bars 2125, 2130 thus observably differ from the representative power consumption instances represented by bars 2105, 2110, 2115, 2120.

Returning to FIG. 20, the device performing process 2000 identifies correlations between the presence of power consumption outliers and other characteristics of the battery-operated electronic devices in the power consumption outliers at block 2010. Thus, the device performing process 2000 identifies characteristics of the battery-operated electronic devices that are likely to be present (or absent) when the power consumption by a device, by an application (or a version of an application), or other element is observably different from representative power consumption in other instances.

In some implementations, the characteristic of a battery-operated electronic device that is identified as correlating with power consumption outliers is the common presence of one or more hardware or software component. For example, correlations between the execution of a second application and power consumption outliers of a first application can be identified. As another example, correlations between the execution of a pair of applications and power consumption outliers of a device can be identified. The identification of such correlations can be taken as an indication that the application(s) somehow change power consumption. In the context of server system 1260, a data aggregation and analysis module 1330 can access a collection of application installation records 1710 to determine whether the presence of certain other applications is correlated with outliers in power consumption of a first application.

In some implementations, correlations are identified by taking a certain percentage (e.g., around 5%) of the instances of the highest amount of power consumed per unit time for a given set of devices and looking for other applications or features that are common to all of those instances.

After correlations have been identified, the device performing process 2000 outputs information describing those correlations at 2015. The information describing those correlations can be used to identify power consumption interactions that give rise to the power consumption outliers. For example, a hardware or software component may interact with an application to change the power consumption by that application. The presence of that hardware or software component will then be correlated with the power consumption outliers for that application.

The output describing the correlations can be received and used by a human or data processing system for the identification of power consumption interactions. For example, an engineer or an expert system of data processing devices may be able to determine the reason why particular hardware components that consume additional power when a pair of applications is present on a device but a relatively lower amount of power when either of the applications is individually present on battery-operated devices of the same class.

By way of example, a first application may direct a battery-operated electronic device to perform relatively intense data-processing activities whenever the device is not in a sleep or other reduced power mode of operation. Since a particular class of battery-operated electronic devices may enter such a reduced power mode of operation quite often, the power consumption by the first application in isolation may not be excessively large. However, a second application may direct a battery-operated electronic device to refrain from entering the reduced power mode. These applications thus interact to increase the power consumption of the first application since the device refrains from ever entering the reduced power mode and constantly performs the relatively intense data-processing activities under the direction of the first application.

Indications that one application somehow changes the power consumption of another can be particularly relevant in battery-operated electronic devices that are provided applications by a variety of unrelated developers. In particular, different developers may develop applications without regard for the impact that their applications have on the power consumption by other applications, and hence on power consumption by the device as a whole. By identifying correlations and outputting information describing such correlations, the device performing process 2000 can allow interactions between applications developed by different developers to be identified, and potentially eliminated, with reduced effort.

Figure 22:
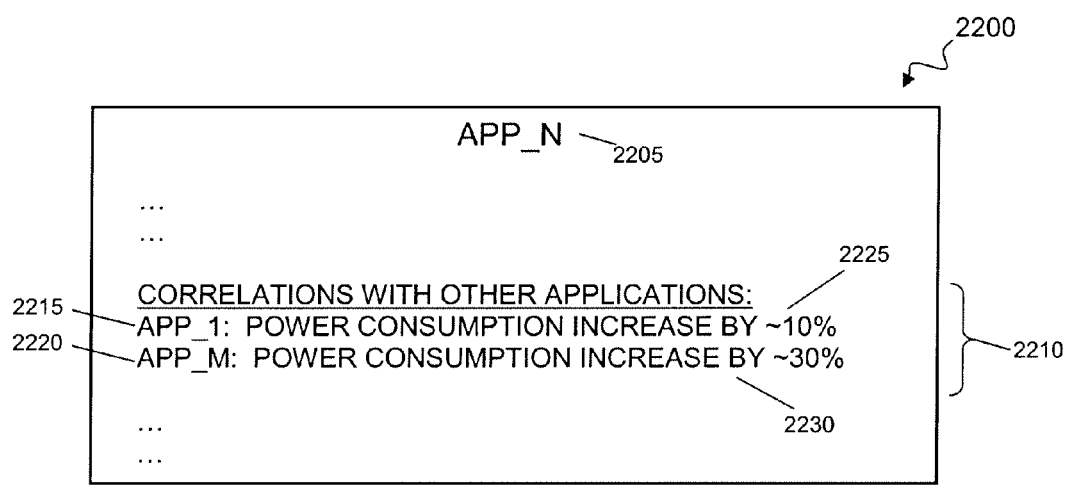
FIG. 22 is a schematic representation of a power consumption feedback presentation that provides a user with information describing interactions between a first application and other applications.

FIG. 22 is a schematic representation of a power consumption feedback presentation 2200 that provides a user with information describing interactions between a first application and other applications.

The interaction information provided by presentation 2200 can be based on historical power consumption records gathered by a system such as server system 1260 in system 1200 (FIG. 12) using methods such as process 1600 (FIG. 16) and/or process 1800 (FIG. 18) and correlations identified by methods such as process 2000 (FIG. 20). For example, power consumption feedback presentation 2200 can be output from server system 1260 directly to a battery-operated electronic device 1205 over network interface 1305. As another example, the information in power consumption feedback presentation 2200 can be output to an intermediary server system that serves power consumption feedback presentation 2200 to a battery-operated electronic device 1205.

Power consumption feedback presentation 2200 includes an identifier 2205 of a first application (i.e., "APP_N") and a collection 2210 of information identifying interactions between the other applications and the application identified by identifier 2205. In the illustrated implementation, information collection 2210 includes identifiers 2215, 2220 of the interfering applications and descriptions 2225, 2230 of the impact of the interference.

In some implementations, presentation 2200 can be provided to users from a site at which different applications are available for download. The described interactions can be considered by a user when downloading applications.

Various implementations of the systems, methods, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems, methods, and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems, methods, and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems, methods, and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A power-management system for electronic devices, the system comprising:
    a collection of battery-operated electronic devices each programmed to generate a record of power consumption, each device comprising
        a battery,
        a data processing unit programmed to execute a plurality of different applications, and
        a communication interface for outputting the record of power consumption; and
    a server system comprising
        a communication interface programmed to receive the records of power consumption output from the battery-operated electronic devices, and
        one or more data processing devices programmed to analyze the power consumption recorded in the records to generate a composite value that provides a representative characterization of the power consumption by a first application executed on a proper subset of the battery-operated electronic devices in the collection.

2. The system of claim 1, wherein the server system further comprises a power consumption database storing at least some of the content of the records of power consumption.

3. The system of claim 2, further comprising an anonymizer programmed to anonymize the records of power consumption so that identities of the battery-operated electronic devices or users associated with the battery-operated electronic devices are not discernable from the content stored in the power consumption database.

4. The system of claim 1, wherein the server system is further programmed to analyze the power consumption recorded in the records to identify outliers in the power consumption of a first application.

5. The system of claim 4, wherein:
    the server system comprises a database that stores information that identifies characteristics of the battery-operated electronic devices in the collection; and
    the server system is further programmed to identify a correlation between the power consumption outliers and a characteristic of the battery-operated electronic devices.

6. The system of claim 5, wherein:
    the database stores information that identifies applications installed on the battery-operated electronic devices in the collection; and
    the characteristic of the battery-operated electronic devices comprises a second application that is installed on the battery-operated electronic devices in which the power consumption outlier occurred.

7. A method performed by one or more data processing apparatus, the method comprising:
    receiving, at the data processing apparatus, historical records of power consumption by a collection of battery-operated electronic devices that are operated by different users, each of the battery-operated electronic devices belonging to a class;
    aggregating and analyzing, by the data processing apparatus, the historical records to generate representative characterizations of the power consumption on different classes of the battery-operated electronic devices; and
    outputting, from the data processing apparatus, the representative characterizations of the power consumption by different applications that have executed on the different classes.

8. The method of claim 7, wherein outputting the characterizations of the power consumption comprises outputting, to a first battery-operated electronic device that belongs to a first class, instructions for displaying a presentation that includes power rating indicia that indicate an efficiency of power consumed by applications on other battery-operated electronic devices belonging to the first class.

9. The method of claim 7, wherein analyzing the historical records comprises identifying outliers in the power consumption of a first application executing on multiple devices.

10. The method of claim 9, wherein analyzing the historical records further comprises identifying correlations between the outliers in the power consumption and execution of a second application on the multiple devices.

11. The method of claim 9, wherein analyzing the historical records further comprises identifying correlations between the outliers in the power consumption and a presence of a hardware component at the multiple devices.

12. The method of claim 7, wherein:
- receiving the historical records of power consumption comprises receiving records of power consumption that is unattributed to particular applications on the battery-operated electronic devices; and
- the method further comprises attributing, by the data processing apparatus, the unattributed power consumption to particular applications that are active on the battery-operated electronic devices.

13. The method of claim 12, wherein attributing the unattributed power consumption comprises identifying the active applications from a record of applications installed on the battery-operated electronic devices.

14. The method of claim 7, wherein the representative characterizations comprise:
- a characterization of an average power consumption per unit time by a first application that has executed on a first class of battery-operated electronic device;
- a characterization of an average power consumption per unit time by a second application that has executed on the first class of battery-operated electronic device;
- a characterization of an average power consumption per unit time by the first application that has executed on a second class of battery-operated electronic device; and
- a characterization of an average power consumption per unit time by the second application that has executed on the second class of battery-operated electronic device.

15. A tangible computer storage medium encoded with a computer program, the program comprising instructions that when executed by data processing apparatus cause the data processing apparatus to perform operations, the operations comprising:
- receiving historical records of power consumption by a collection of battery-operated electronic devices operated by different users;
- attributing the power consumption to different applications executing on the battery-operated electronic devices;
- generating a collection of composite values that each characterize representative power consumption by one of the applications executing on the battery-operated electronic devices; and
- reporting the composite values.

16. The computer storage medium of claim 15, wherein the composite values each characterize representative power consumption per unit time by execution of one of the applications on a different class of battery-operated electronic devices.

17. The computer storage medium of claim 15, wherein the historical records are received during check-ins of individual ones of the battery-operated electronic devices.

18. The computer storage medium of claim 15, wherein the historical records comprise a discharge rate of a battery of the battery-operated electronic devices.

19. The computer storage medium of claim 15, wherein the operations further comprise receiving usage information characterizing usage of applications installed on the battery-operated electronic devices.

20. The computer storage medium of claim 19, wherein the usage information characterizes duration of periods during which applications are used at the same time on the battery-operated electronic devices.

* * * * *